United States Patent
Onggosanusi et al.

(10) Patent No.: US 7,110,378 B2
(45) Date of Patent: Sep. 19, 2006

(54) CHANNEL AWARE OPTIMAL SPACE-TIME SIGNALING FOR WIRELESS COMMUNICATION OVER WIDEBAND MULTIPATH CHANNELS

(75) Inventors: Eko Nugroho Onggosanusi, Dallas, TX (US); Barry Dean Van Veen, McFarland, WI (US); Akbar Muhammad Sayeed, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 957 days.

(21) Appl. No.: 09/970,460

(22) Filed: Oct. 3, 2001

(65) Prior Publication Data
US 2002/0114269 A1    Aug. 22, 2002

Related U.S. Application Data

(60) Provisional application No. 60/237,626, filed on Oct. 3, 2000.

(51) Int. Cl.
*H04Q 7/00*   (2006.01)
(52) U.S. Cl. .................................................. 370/334
(58) Field of Classification Search ............. 370/334, 370/329, 332
See application file for complete search history.

(56) References Cited

U.S. PATENT DOCUMENTS

| 6,101,176 | A  | * | 8/2000  | Honkasalo et al. | 370/335 |
| 6,351,499 | B1 | * | 2/2002  | Paulraj et al.   | 375/267 |
| 6,643,526 | B1 | * | 11/2003 | Katz             | 455/562.1 |
| 6,775,233 | B1 | * | 8/2004  | Kumaran et al.   | 370/230.1 |
| 2003/0139186 | A1 | * | 7/2003 | Igarashi et al.  | 455/438 |

* cited by examiner

*Primary Examiner*—Huy D. Vu
*Assistant Examiner*—Jason Mattis
(74) *Attorney, Agent, or Firm*—Foley & Lardner LLP

(57) ABSTRACT

A method and system is described for more optimally managing the usage of a wideband space-time multipath channel. The wideband space-time multipath channel is decomposed into a plurality of orthogonal sub-channels, where the orthogonal sub-channels having the best signaling characteristics are used for transmitting one or more signal streams. For purposes of decomposing the wideband space-time multipath channel into a plurality of orthogonal sub-channels, channel estimates are determined for each signal propagation path. A closed-form singular value decomposition of the channel corresponding to each receive antenna before coherent combining is utilized to obtain an orthogonal decomposition of the overall effective space-time channel after coherent combining. By using the overall effective space-time channel after coherent combining rather than before coherent combining, the complexity and correspondingly the resources required for obtaining the orthogonal sub-channels is significantly reduced. The method and system further provide for transmit power to be allocated between the selected sub-channels in order to minimize the effective bit-error rate for a fixed average throughput or to maximize average throughput for a fixed minimum effective bit-error rate.

30 Claims, 18 Drawing Sheets

CHANNEL AWARE OPTIMAL SPACE-TIME SIGNALING FOR WIRELESS COMMUNICATION OVER WIDEBAND MULTIPATH CHANNELS

This application claims the benefit of U.S. Provisional Application Ser. No. 60/237,626, filed Oct. 3, 2000, which is hereby incorporated by reference in its entirety.

This invention was made with United States government support awarded by the following agencies: NSF ECS-9979448. The United States has certain rights in this invention.

BACKGROUND OF THE INVENTION

1. Field of the Invention

The present invention relates to communication of one or more data signal streams over a wideband space-time multipath channel, and more particularly to the decomposition and selection for use of one or more sub-channels within the multipath channel.

2. Description of Related Art

The use of wireless communications has grown significantly over the past several years. With it the need to make better utilization of the available spectrum, which is allocated for use in wireless communications, has similarly grown.

In order to support multiple private two-way communications, the available spectrum is generally divided into a plurality of minimally and/or non-interfering sub-channels which are then dynamically allocated between users on a per request basis. Several techniques have been used to improve the utilization of the available spectrum, including improvements in frequency division, signal modulation, and spatial division.

Improvements in frequency division techniques have enabled a greater number of subchannels to be defined in the allotted spectrum by allowing the available frequency to be divided into narrower distinct slices or frequency bands. Improvements in signal modulation techniques including signal compression, time division multiplexing and spread spectrum techniques, such as code division multiple access, have enabled enhancements in both signal quality and channel capacity. Improvements in spatial division techniques which have traditionally included creating localized transmission areas, or cells, and other techniques for geographically restricting signal transmissions, have enabled frequency to be reused in geographically distinct and non-adjacent areas.

More recently spatial division techniques have begun to take advantage of inherent constructive and destructive interfering signal patterns between similar signals originating from or received by multiple spaced apart antennas to more narrowly define a signal region between which a signal is being transmitted or received. In this way signal patterns can be defined in such a way so as to focus a signal transmission within a select portion of a given geographical area by maximizing the strength of the signal directed toward an intended recipient, while minimizing the strength of the signal directed toward non-intended recipients for which the signal might create unwanted interference.

In addition to inherent constructive and destructive interfering signal patterns between signals originating from or received by multiple spaced apart transmitting and receiving antennas, constructive and destructive interfering signal patterns are also created by signals which travel between a transmitter and receiver via multiple signal paths. Multiple signal paths can result from signals which reflect off of one or more structures located between a particular transmitter and receiver as the signal radiates outward. In many instances the reflection of a signal can cause that portion of a signal's energy to be deflected in a manner so as to never be received by the receiver. In other instances a portion of the signal's energy could reflect off of one or more interfering surfaces and be redirected back towards the receiver. Regardless, various portions of a signal often reach their destination via one of a couple of different signal paths. A signal reaching its destination along different paths will often result in the different components of the signal arriving at a different angle and/or arriving at a different time.

In the past, the reception of the same signal at different times was generally destructive in nature and seen as another source of noise known as inter-symbol interference. Inter-symbol interference resulting from reception of the same signal at different times due to signal propagation along different paths, generally created a limit on the rate at which data symbols could be transmitted. However more recent techniques have recognized that this inter-symbol interference if accounted for could also be used to enhance signal transmissions, once the transmission characteristics between the two points are known. One such technique includes the use of space-time beamformer technology.

However one of the complications associated with implementing a spatially distinct transmission which constructively combines the multipath signaling characteristics is the amount of computational resources required to compute the transmission requirements and reception requirements for establishing such a geographically discriminating communication connection. The amount of computational resources required for maintaining a spatially distinct transmission is further complicated by the fact that in many wireless communication applications, the transmitter and the receiver are in motion with respect to one another, and/or the objects against which the signal is being reflected are moving with respect to the transmitter and/or the receiver. Consequently, the transmission requirements and reception requirements may need to be recalculated or updated to take into account the continuously changing environment within which the desired communications are taking place, thereby making even greater demands upon the computational resources available for maintaining the quality of communications.

It would therefore be desirable to provide a method for managing the usage of a space-time channel and a channel state processing unit, which reduces the computational resources required for maintaining a spatially distinct transmission including those which make use of space-time beamformer technology.

These and other objects, features, and advantages of this invention are evident from the following description of a preferred embodiment of the present invention, with reference to the accompanying drawings.

SUMMARY OF THE INVENTION

The present invention provides a method for managing the usage of a space-time channel having a plurality of orthogonal sub-channels in a communication system. The system includes a transmitter having one or more transmit antennas, a receiver having one or more receive antennas, and one or more signal propagation paths between each of said one or more transmit antennas and each of said corresponding one or more receive antennas, where channel state information is available at the transmitter. The method includes estimating the channel for each signal propagation path. A closed-form orthogonal decomposition of the overall effective multi-input multi-output channel after coherent combining is used to determine one or more orthogonal sub-channels. The orthogonal sub-channels having preferred signaling characteristics from the one or more determined sub-channels are then selected for usage.

In at least one embodiment the closed-form orthogonal decomposition is obtained for each of a plurality of signal frequencies.

In another embodiment, after the sub-channels for usage are selected, the transmit power available to the transmitter for transmission of one or more data streams via one or more corresponding selected sub-channels is allocated between the selected sub-channels.

In another aspect of the invention a channel state processing unit is provided for use in the communication system. The channel state processing unit includes a central processing unit, which includes means for determining channel state information, means for estimating the channel for each receive antenna, means for coherently combining the channel estimates for each receive antenna, means for obtaining a closed form orthogonal decomposition of the coherently combined channel estimates, and means for selecting usage of one or more orthogonal sub-channels. In at least one embodiment the central processing unit includes a digital signal processor, where each of the means is a set of program operating instructions and corresponding program data being executed by the digital signal processor.

By coherently combining the channel estimates across all the receive antennas a computationally less intensive closed form decomposition can be obtained for each receive antenna for determining the available orthogonal sub-channels and the channel characteristics associated therewith. This closed-form orthogonal decomposition of the overall channel after coherent combining is made possible by a closed form singular value decomposition (SVD) of the channel for each receiver antenna before coherent combining. This is opposed to systems which contain more than a single receive antenna and which do not coherently combine channel estimates. For these systems, a determination of orthogonal sub-channels needs to be computed numerically, which generally requires a significant amount of computing resources, because a closed form solution does not exist.

Other features and advantages of the present invention will be apparent from the following detailed description, the accompanying drawings, and the appended claims.

DETAILED DESCRIPTION OF PREFERRED EMBODIMENTS

Figure 1:
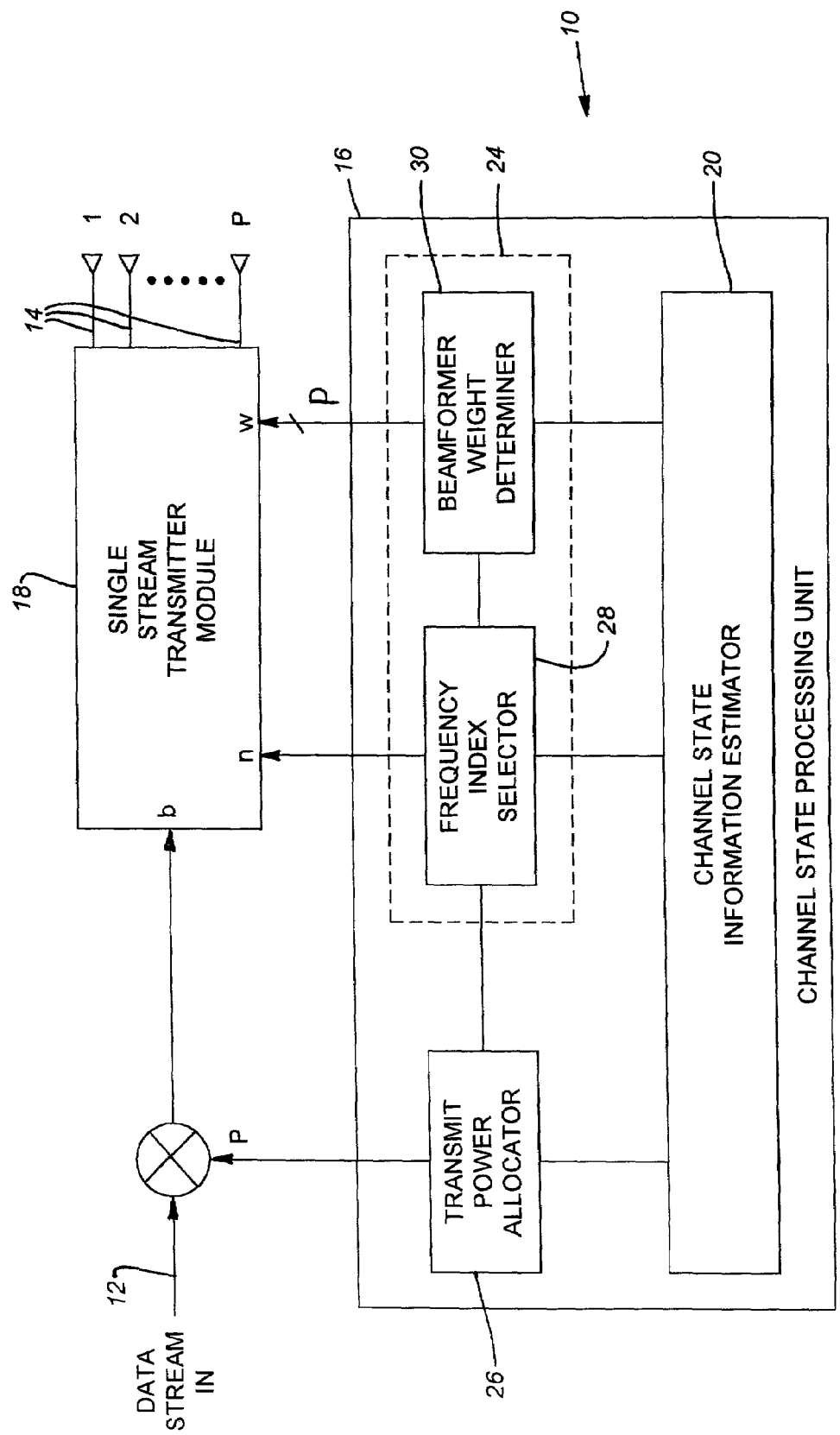
FIG. 1 is an exemplary schematic block diagram of a transmitter for transmitting a single stream of data, via a plurality of transmit antennas, for use in accordance with at least one embodiment of the present invention.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Generally a multi-antenna framework can be defined to include P transmit antennas embodied within one or more transmitters, Q receive antennas embodied within one or more receivers, and L propagation paths between the respective antennas. Within the multi-antenna framework, typically a plurality of non-interfering sub-channels can be defined. Transmission via the various sub-channels can be controlled through the appropriate selection of the values for a beamformer vector and the specific value for a frequency index. By carefully computing or selecting the sets of values from which the beamformer vector and the frequency index are selected, substantially orthogonal and/or non-interfering sub-channels can be defined.

FIG. 1 illustrates an exemplary schematic block diagram of a transmitter 10 for transmitting a single stream of data 12, via a plurality of transmit antennas 14. The data stream 12 typically comes from the output of an encoder combined with a modulator. The encoder corresponds to a certain error-correcting code, such as block code, convolutional code, concatenated code, Turbo code, or any other kinds.

Figure 4:
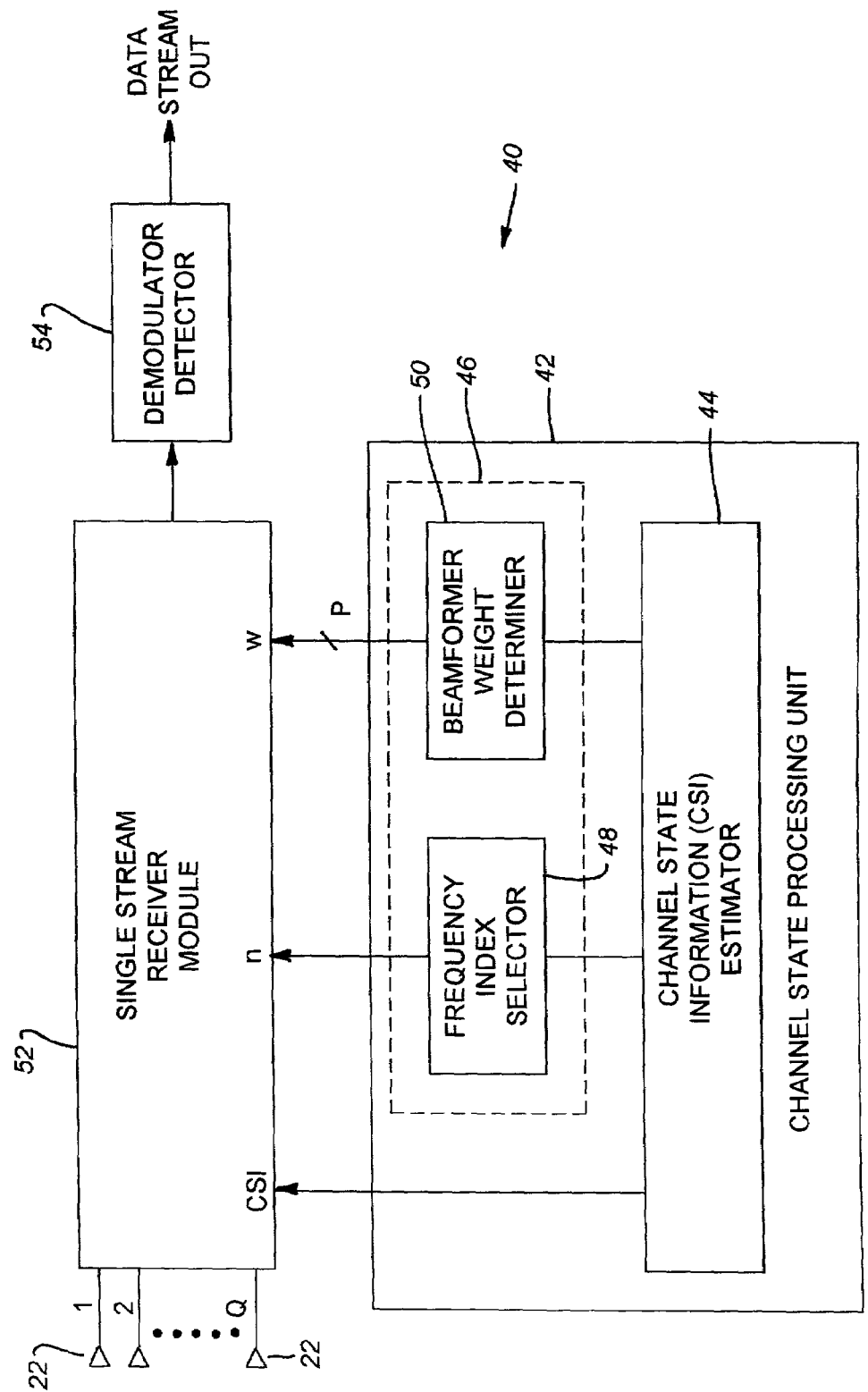
FIG. 4 is an exemplary schematic block diagram of a receiver for receiving a single stream of data transmitted from a transmitter like the one shown in FIG. 1, via a plurality of receive antennas, for use in accordance with at least one embodiment of the present invention.

The modulator is a device that maps a binary data stream (composed of zeros and ones) onto a signal constellation. Examples of modulation scheme are phase shift keying (PSK), pulse amplitude modulation (PAM), quadrature amplitude modulation (QAM). The transmitter 10 includes a channel state processing unit 16 and at least one single stream transmitter module 18 coupled to the channel state processing unit 16. The channel state processing unit 16 incorporates a channel state information estimator 20 which identifies a set of available orthogonal sub-channels within the channel space by analyzing the inherent gain associated with each signal path between each of a set of one or more transmit antennas 14 and each of a set of one or more corresponding receive antennas 22, as shown in FIG. 4. The channel state processing unit 16 additionally incorporates sub-channel selection circuitry 24 and a transmit power allocator 26, both of which are coupled to the channel state information estimator 20. The sub-channel selection circuitry 24 selects for usage one or more sub-channels for use by one or more signal stream transmitter modules.

The sub-channels are typically selected based upon the sub-channel having preferred signaling characteristics as determined through an analysis of the channel state information. In connection with selecting a sub-channel, a frequency index is selected and a corresponding set of beamformer weights are determined, both of which are respectively identified by a frequency index selector 28 and a beamformer weight determiner 30. Once selected, the frequency index and the set of beamformer weights are passed on to the single stream transmitter module 18. The single stream transmitter module 18 additionally receives a stream of data 12, often after the signal strength of the stream of data 12 has been modulated by a power amplification factor. The power amplification factor is determined by the transmit power allocator 26 as part of the channel state processing unit 16.

While the transmitter 10 in FIG. 1 has been shown using one single stream transmitter module 18, it will be readily apparent to one skilled in the art that multiple single stream transmitter modules 18 could be coupled in parallel. Each single stream transmitter module 18 would receive its own frequency index and set of beamformer weights corresponding to the unique sub-channel selected and receive a unique data stream for transmission. Where multiple single stream transmitter modules 18 are used, the signal outputs from each transmitter module 18 corresponding to the same antenna 14 would be summed together prior to transmission by the specific antenna 14.

Figure 2:
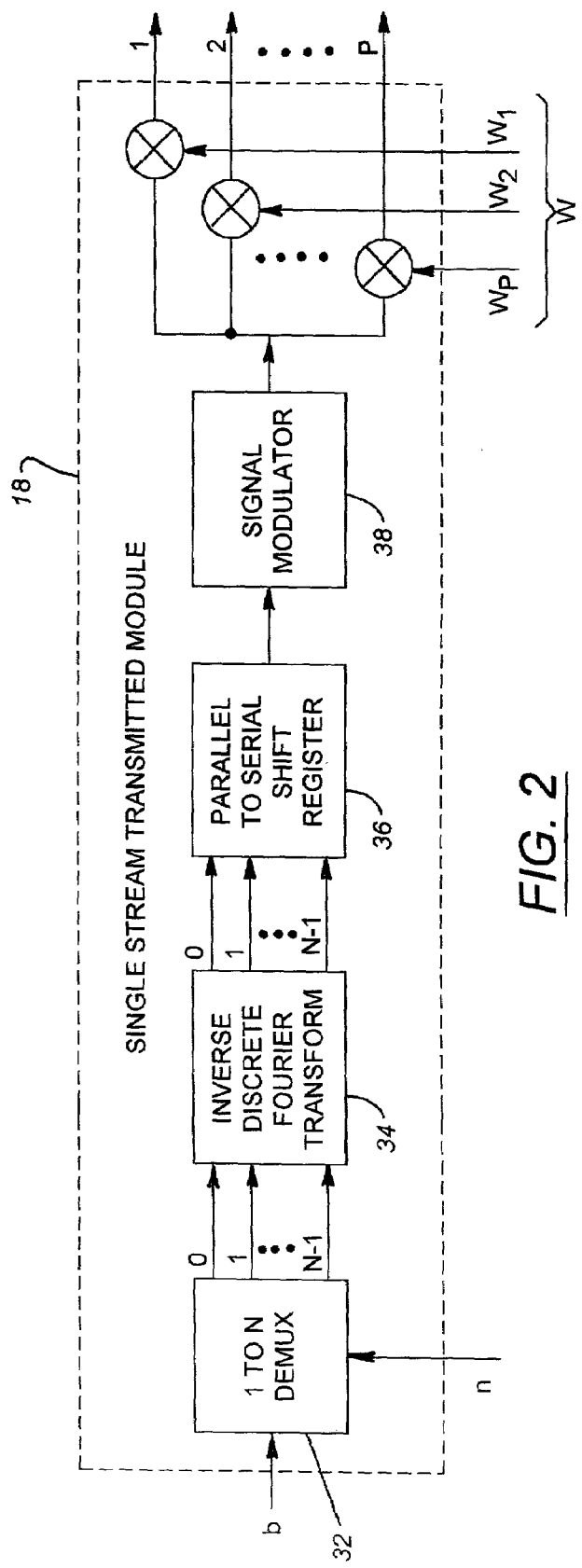
FIG. 2 is an exemplary schematic block diagram of a single stream transmitter module for use in the transmitter shown in FIG. 1 according to one embodiment.

The single stream transmitter module 18, which is illustrated in greater detail in FIG. 2, includes a 1-to-N demultiplexer 32 which receives the data stream via the single input and selectively routes the data stream to one of N outputs based upon the value of a frequency index (n) received. The N outputs, including the one through which the data stream is being routed, are received as a set of signal coefficients by an inverse discrete Fourier transformation circuit 34. The inverse discrete Fourier transformation circuit 34 then converts the signal coefficients into N time varying output samples which define a sinusoidal signal having a frequency corresponding to the particular coefficient for which the signal stream is received and an amplitude corresponding to the received value of the signal stream. The output of the inverse discrete Fourier transformation circuit 34 is then coupled to a parallel to serial shift register 36 which serializes the data into a time converted signal stream. The time converted signal stream is then coupled to a signal modulator 38, which modulates the signal stream in accordance with the chip waveform. The modulated signal stream is then coupled to each of the transmit antennas (1, 2, . . . P) 14 after being appropriately weighted by the corresponding value ($W_1, W_2, \ldots W_p$) from the weight vector. Where multiple single stream transmitter modules 18 are used, each of the weighted signal streams for a particular antenna 14 are summed together before being coupled to the corresponding antenna 14.

Figure 3:
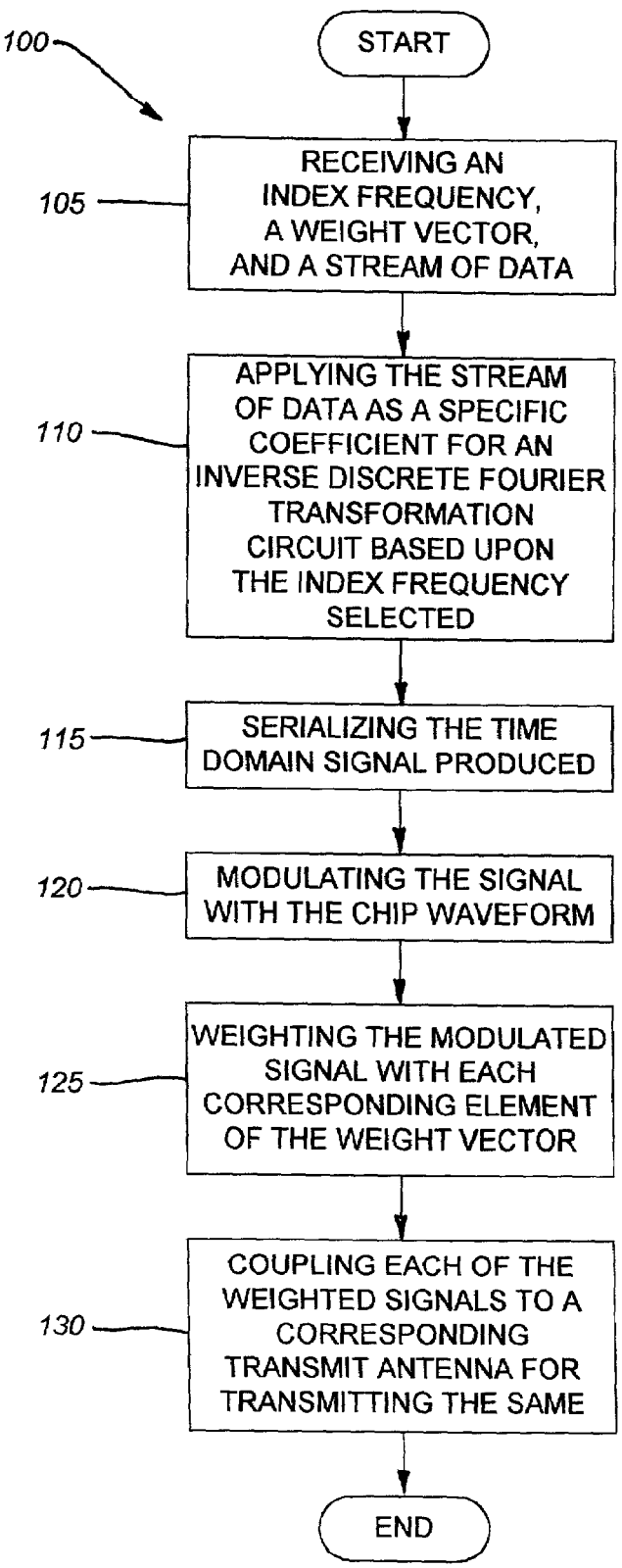
FIG. 3 is an exemplary flow diagram of a method for transmitting a stream of data using the transmitter shown in FIG. 1 according to one embodiment.

An exemplary corresponding flow diagram is shown in FIG. 3, which outlines a method 100 for transmitting a stream of data using the transmitter 10 shown in FIG. 1 and is consistent with the signal flow discussed in connection with the single stream transmitter module 16 shown in FIG. 2.

More specifically, the method 100 for transmitting a stream of data, shown in FIG. 3, includes, in step 105, receiving an index frequency, a weight vector, and a stream of data. The stream of data is applied to an inverse discrete Fourier transformation circuit as a specific coefficient based upon the index frequency received in step 110, thereby producing a time domain signal. The time domain signal is then serialized in step 115. The method 100 further provides for modulating the serialized time domain signal with the chip waveform in step 120. The modulated signal is then weighted with each corresponding element of the weight vector in step 125. Each of the weighted signals is then coupled to the corresponding transmit antenna in step 130 for transmitting the same.

FIG. 4 illustrates an exemplary schematic block diagram of a receiver 40 for receiving a single stream of data transmitted from a transmitter 10 having multiple transmit antennas 14 like the one shown in FIG. 1. Like the transmitter 10, the receiver 40 includes a channel state processing unit 42 and a corresponding channel state information estimator 44, which similarly identifies a set of orthogonal sub-channels within the channel space by analyzing the transmission characteristics associated with each signal path between each of a set of one or more transmit antennas 14 shown in FIG. 1 and each of a set of one or more corresponding receive antennas 22. In some instances, the channel state information is determined by directly monitoring the characteristics of the signals received. In other instances, the already determined and/or partially processed channel state information is otherwise communicated between the transmitter 10 and the receiver 40.

The channel state processing unit 42 additionally incorporates sub-channel selection circuitry 46, which is coupled to the channel state information estimator 44. The sub-channel selection circuitry 46 includes a frequency index selector 48 and a beamformer weight determiner 50. Similar to the channel state information, in some instances the frequency index, and the corresponding set of beamformer weights or beamformer weight vector are determined directly in both the transmitter 10 and receiver 40. In other instances, the frequency index and the beamformer vector are determined in one and are communicated to the other.

The channel state information, frequency index, and beamformer weight vector are supplied to a single stream receiver module 52, which is coupled to the channel state processing unit 42. Using the channel state information, the frequency index, and the beamformer weight vector, the single stream receiver module 52 isolates the signal being transmitted on the indicated sub-channel received via the plurality of receive antennas 22. The isolated signal is then coupled to a demodulator/detector 54 which converts the signal into a stream of data symbols.

The receiver 40 can include additional single stream receiver modules 52, similar to the transmitter 10 and the corresponding single stream transmitter module 18 shown in FIG. 1, where each single stream receiver module 52 is commonly coupled to the plurality of receive antennas 22, but is also coupled to its own demodulator/detector 54. In this way a plurality of data streams transmitted along a plurality of corresponding sub-channels can be received.

Figure 5:
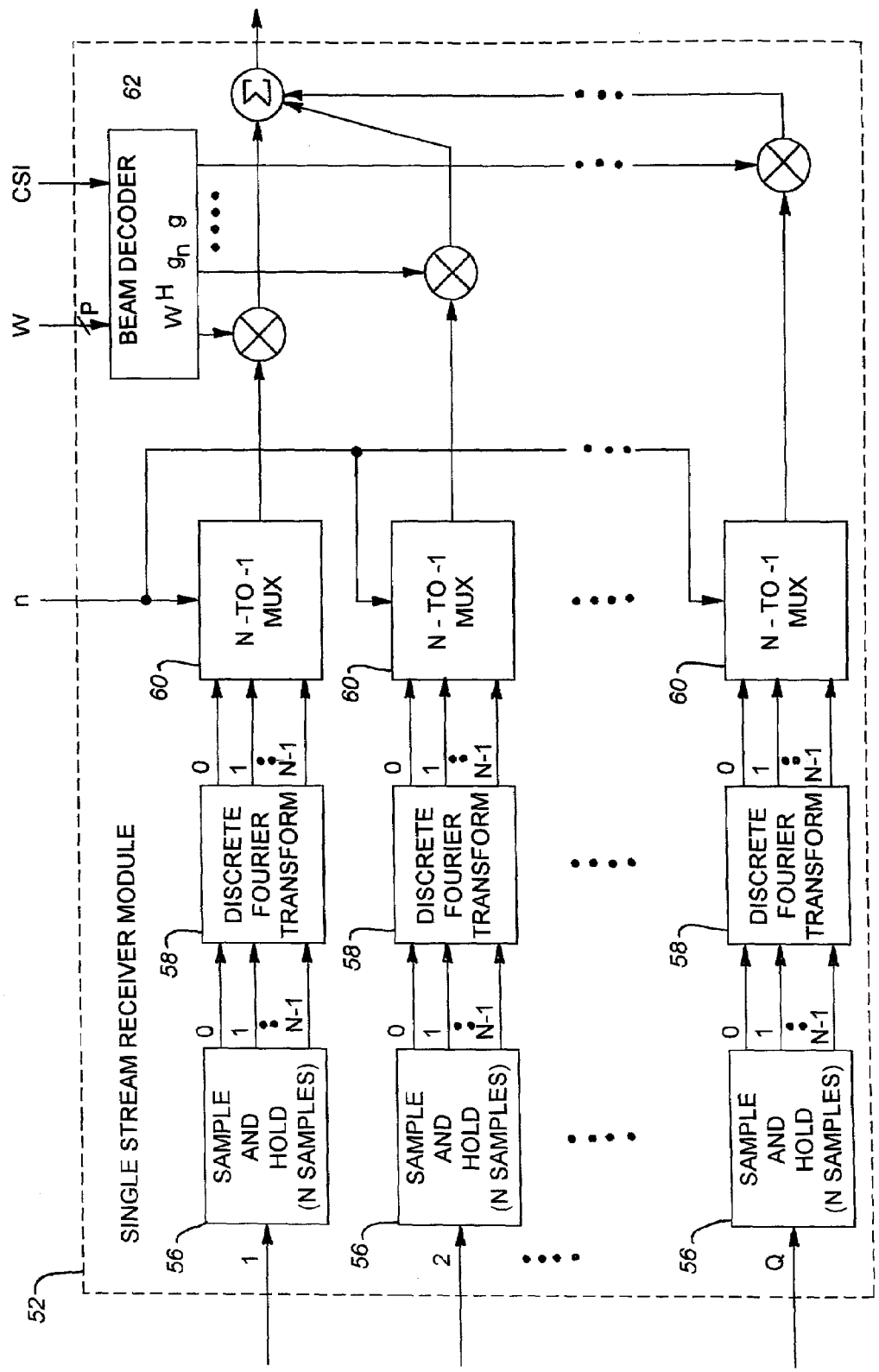
FIG. 5 is an exemplary schematic block diagram of a single stream receiver module for use in the receiver shown in FIG. 4.

Each single stream receiver module 52, in accordance with the illustrated embodiment shown in FIG. 5, includes a plurality of sample and hold circuits 56. Each sample and hold circuit 56 is coupled to a corresponding receive antenna 22. The sample and hold circuits 56 each sequentially stores the N time domain signal samples received via the receive antenna 22 coupled thereto. The N time domain signal samples are then sent to a respective discrete Fourier transformation circuit 58, which is coupled to each of the sample and hold circuits 56. The discrete Fourier transformation circuit 56 then converts the N time domain signal samples into N frequency domain signal coefficients. Each discrete Fourier transformation circuit 58 is additionally coupled to a respective N-to-1 multiplexer 60, which receives the N frequency domain signal coefficients. Each of the N-to-1 multiplexers 60 also receives the frequency index signal for selecting the signal frequency coefficient of interest. The selected signal frequency coefficient for each of the receive antennas 22 is then modulated with a corresponding beam decoder weight value, and the resulting modulated signal frequency coefficient values are summed together with the other modulated signal frequency coefficient values for each of the receive antennas 22.

A received data stream value is determined from the sum of the modulated signal frequency coefficient values. The beam decoder weight values used in determining the modulated signal frequency coefficient values are determined by a beam decoder circuit 62. The beam decoder circuit 62 determines the beam decoder weight values based upon an analysis of the beamformer weight vector (W) and the channel state information (CSI). The single stream receiver module 52 uses each sequence of received N time domain signal samples for determining the subsequent data values in the data stream received.

Figure 6:
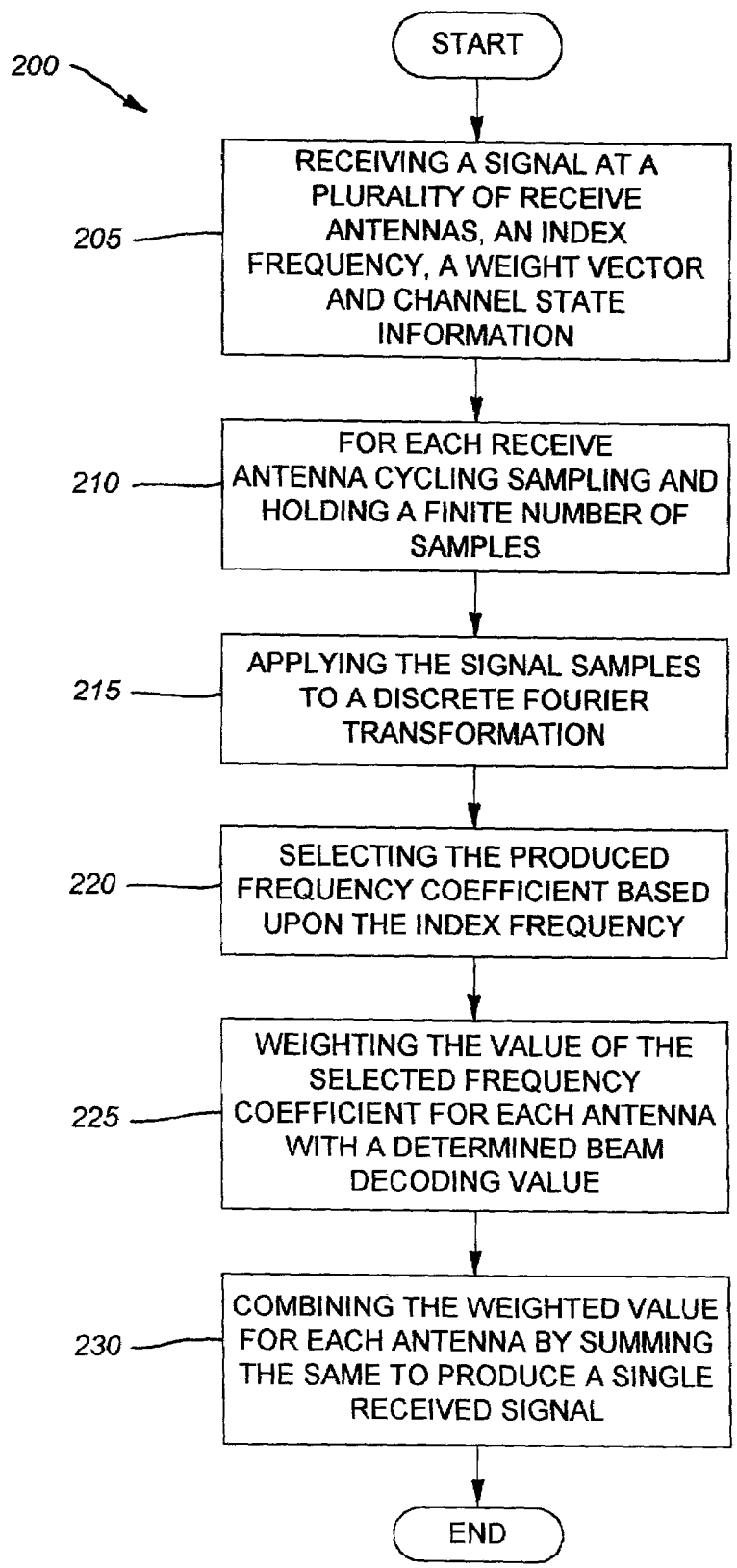
FIG. 6 is an exemplary flow diagram of a method for receiving a stream of data transmitted as shown in FIG. 3, using the receiver shown in FIG. 4 according to one embodiment.

Similar to the transmitter 10 shown in FIGS. 1 and 2 and corresponding method 100 illustrated in FIG. 3, an exemplary corresponding flow diagram which outlines a method 200 for receiving a stream of data using the receiver 40 shown in FIG. 4, and corresponding single stream receiver module 52 shown in FIG. 5, is shown in FIG. 6.

More specifically, the method 200 for receiving a stream of data, shown in FIG. 6, includes receiving a signal at each of a plurality of receive antennas, an index frequency, a weight vector, and channel rate information in step 205. For each receive antenna, a finite number of samples are cyclically sampled and held in step 210. The signal samples are then applied to a discrete Fourier transformation circuit, which produces a set of frequency coefficients in step 215. One or more of the produced frequency coefficients are selected, based upon the index frequency received in step 220. The value of the selected frequency coefficient for each antenna is then weighted with a determined beam decoding value in step 225. The weighted value for each antenna is then combined by summing the weighted values to produce a single received signal in step 230.

Figure 7:
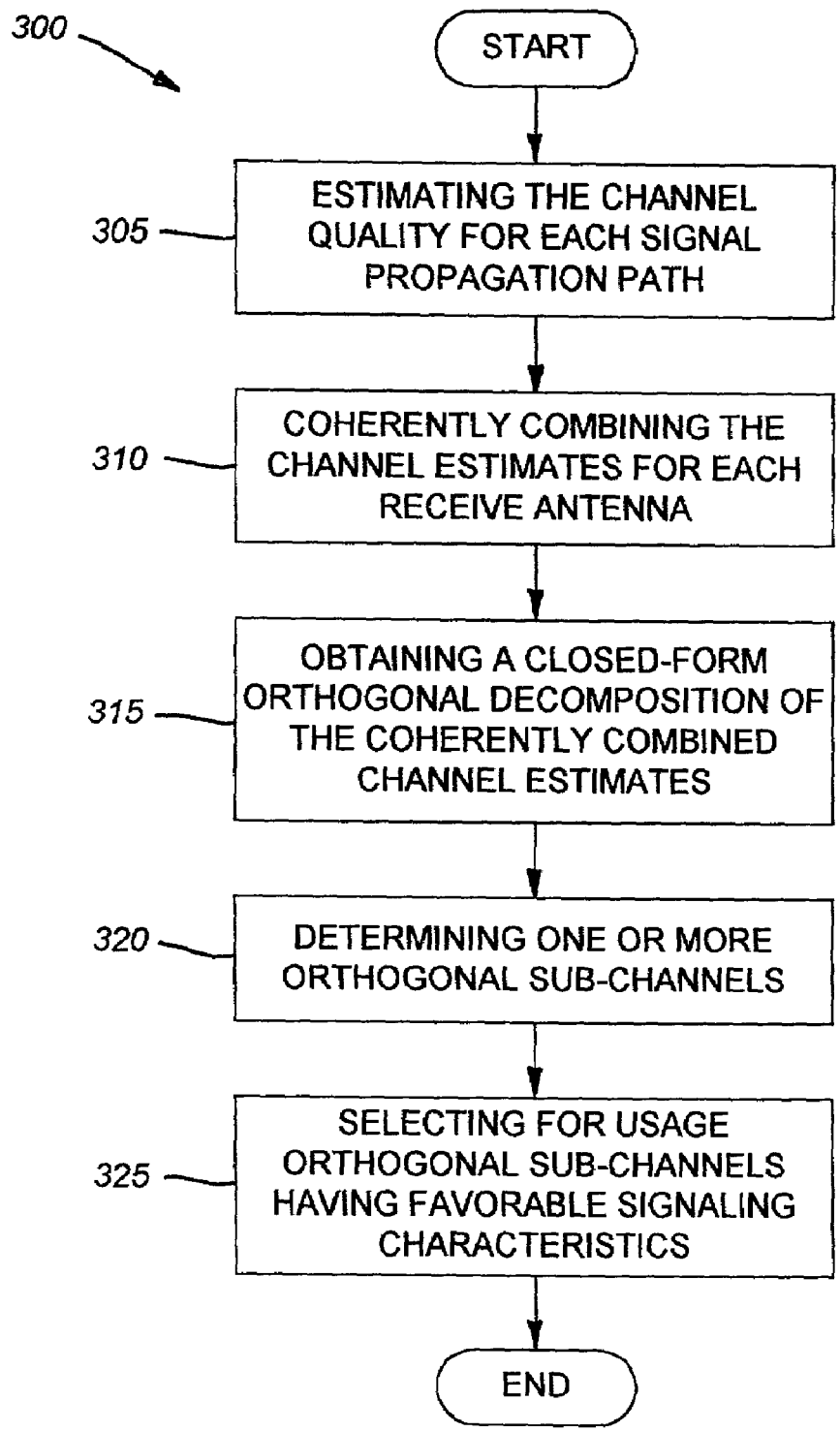
FIG. 7 is a flow diagram of the method for managing the usage of a space-time channel including the identification and selection of orthogonal sub-channels for use in a communication system, in accordance with one embodiment of the present invention.

Central to the transmission and reception of one or more data streams via the one or more sub-channels in a wideband space-time multipath channel is the determination of the channel state information, the identification of a set of available orthogonal sub-channels, and the corresponding selection of the frequency index and the beamformer weight vector. However, as noted previously, the determination, selection, and maintenance of a plurality of orthogonal sub-channels can require a considerable amount of computational resources. FIG. 7 illustrates an exemplary flow diagram of a method 300 for managing the usage of a space-time channel. The method 300 represents an approach which reduces the amount of computational resources required for managing the usage of a space-time channel. More specifically, the present approach enables a closed form solution to be developed for systems containing more than one receive antennas. Where previous systems identified available sub-channels through the computation of the singular value decomposition of the channel estimator for the overall space-time channel, the present method 300 obtains a closed-form orthogonal decomposition of the space-time channel from the overall effective channel after coherent combining.

Initially the method 300 provides for estimating the overall channel by determining the signaling characteristics for each signal propagation path in step 305. In at least one embodiment, the channel estimate is determined by transmitting a series of training symbol sequences from each of the one or more transmit antennas 14. The training symbol sequences are then received at each of the one or more receive antennas 22 and a signal gain (which includes amplitude and phase) and path delay for each signal path is determined.

The channel estimates are coherently combined in step 310, and a closed-form orthogonal decomposition of the coherently combined channel estimates is obtained in step 315. From the closed-form orthogonal decomposition one or more orthogonal sub-channels are determined in step 320, and the orthogonal sub-channels having favorable signaling characteristics are selected for usage in step 325.

As noted above, in at least one embodiment, the overall channel including the signaling characteristics for each signal propagation path can be determined through an analysis of the transmission and reception of one or more sequences of training samples. For example signal gain and signal propagation delay can be determined for signals transmitted between each of the corresponding transmit antennas 14 and receive antennas 22. In at least some embodiments, the observed signal propagation delays are used to help define the one or more signal propagation paths.

The exemplary embodiment isolates the gain associated with the transmission between a specific transmit antenna and a specific receive antenna by transmitting a symbol sequence from one of the transmit antennas, and measuring the strength and arrival time of the various components of the signal received at each of the receive antennas. The transmitted training symbols are selected so as to be readily distinguished from other transmission sequences from other transmission sources. Knowledge of the transmitted signal strength and the corresponding received signal strength, analyzed separately for each of the receive antennas, is then used to determine the signal gain (h) for each path (l) between the corresponding receive antenna (q) and transmit antenna (p). Similarly, the signal propagation delay ($\tau$) for each of the paths between each of the transmit antennas and receive antennas can be determined by comparing the known transmit time with a determined reception time, again analyzing the determined reception time(s) for each of the receive antennas separately. This same or similar training process is performed for each of the transmit antennas 14.

For a more efficient determination of the overall channel, the signaling characteristics for signals originating from different transmit antennas 14 can sometimes be performed at the same time by simultaneously transmitting distinguishable training symbol sequences from each of two or more of the multiple transmit antennas 14. In at least one embodiment, the simultaneously transmitted sets of training symbol sequences are transmitted at separate frequencies. The multiple frequencies provide sufficiently distinct transmissions, which enable the circuitry associated with the receiving antennas 22 to sufficiently distinguish the portions of the received signal attributable to the signals transmitted at each of the transmit antennas 14. As a result, the training of multiple transmit antennas 14 are enabled to occur simultaneously.

The determined channel characteristics ($h_{lqp}$) for the available signal paths of the multiple-input multiple-output space-time channel is combined to form a single matrix H, which represents the overall channel. An analysis of the matrix H can then be performed to determine the parameters for a list of appropriate sub-channels. One aspect of analysis of matrix H enables the number of orthogonal space-time dimensions to be determined. The number of orthogonal space-time dimensions corresponds to the degrees of freedom or the number of available non-interfering sub-channels. The number of space-time dimensions, also generally corresponds to the rank of matrix H. One of the preferred features of the present invention is to provide a method/system, which is capable of accessing all available space-time dimensions and/or all degrees of freedom.

In the analysis of the transmitted and received signals, it is often convenient to analyze the signals by sampling the signals at discrete time intervals. Dividing the signals into discrete signal samples enhances the ability to apply digital signal processing techniques to the transmitted and received signals. Generally, the signals are already inherently subdivided as a sequence of symbols, where each symbol has a corresponding symbol interval. Symbols can be representative of individual binary encoded bits, or any other convenient data representation. In at least one embodiment the rate at which the symbols are transmitted is limited so as to provide for a symbol interval duration (T), which is appreciably larger than the largest transmission delay ($\tau$) typically associated with the longest meaningful signal propagation path between the transmit and receive antennas.

It is often times also convenient, for purposes of signal analysis, to further subdivide the symbol interval into a plurality (N) of chip intervals (1/B). The chip interval, correspondingly, generally defines the rate at which the transmitted and received signals are sampled. Ideally the chip interval will be selected so that the path delays ($\tau$) can be conveniently represented as an integer multiple of the chip interval.

As a result of sampling each symbol N times, a channel characteristic can be determined for each chip interval. This results in a matrix H, where the number of rows and columns are similarly multiplied by the number of samples for a given symbol interval, N, and which enables constructive and/or destructive interfering signals resulting from signal propagation delays via multiple alternative signal paths to be accounted for. In the illustrated embodiment, the matrix H representing the channel characteristics of the space-time channel includes N×Q rows and N×P columns. As noted previously the number of non-interfering sub-channels corresponds to the number of orthogonal space-time dimensions.

The specific orthogonal vectors corresponding to the non-interfering sub-channels can be determined by computing the value of the singular value decomposition of matrix H. The resulting inherently orthogonal eigenvectors can then be used to derive the set of appropriate weights for forming the necessary beamformer vectors for transmitting and receiving signals via the orthogonal sub-channels. Assuming the channel coefficients are not perfectly correlated, the number of space-time channels (i.e. non-interfering sub-channels) is typically equal to N multiplied by the minimum of the number of transmitting antennas (P) or receiving antennas (Q).

However as noted previously one of the difficulties with space-time channels having greater than one receive antenna is that a closed form solution for the singular value decomposition (SVD) of matrix H can not be obtained. Consequently, the SVD needs to be computed numerically. Because the number of samples per symbol N for wideband applications is typically relatively large, numerical computation of the singular value decomposition is generally prohibitive in practice, due to the corresponding complexity of the determination for a relatively large matrix. Additionally, the problem is further compounded by the fact that the determination needs to be repeated, sometimes rather frequently, to account for relative movement of the transmitter and the receiver, and/or to account for a constantly changing environment.

The present inventors have recognized an alternative to attempting to analyze the multiple-input multiple-output space-time channel by determining the singular value decomposition for the matrix H. First, the inventors realize that there exists a closed form singular value decomposition (SVD) of $H_q$ (the channel corresponding to the q-th receive antenna before coherent combining). This closed-form SVD of $H_q$ can then be used to obtain a closed-form orthogonal decomposition of the overall effective space-time channel after coherent combining, namely:

$$\sum_{q=1}^{Q} H_q^H H_q$$

This alternative approach is capable of similarly providing access to all degrees of freedom (i.e. all of the available non-interfering sub-channels). Once the channel estimates have been coherently combined across all of the receive antennas, the most computationally complex operation in finding the available orthogonal sub-channels is finding the eigenvectors for N matrices, each having a size of P×P. This is generally much less computationally complex than computing the eigenvectors of one matrix having a size NQ×NP, since in practice for wideband applications the number of samples per symbol N is generally relatively large and number of transmit antennas P is generally relatively small.

In at least one embodiment coherently combining the channel estimates across all receive antennas includes developing a space-time channel matrix $H_q$ for each receive antenna by multiplying a time-shift matrix corresponding to all of the path delays by the Kronecker product of the transpose of a matrix containing the channel estimates for a single receive antenna and an identity matrix ($H_q = \Delta(H_q^T \otimes I_N)$).

Coherently combining the received signal in accordance with the channel estimates across all receive antennas further includes determining the conjugate transpose ($H_q^H$) of the space-time channel matrix ($H_q$) for each of the receive antennas and multiplying it by the respective signal received at each of the corresponding receive antennas. The products determined for each of the receive antennas (q) are then summed together. In equation form, coherently combining the channel estimates across all receive antennas can be represented as:

$$\tilde{r} \stackrel{def}{=} \sum_{q=1}^{Q} H_q^H r_q \tag{1}$$

The matrix containing the channel estimates for a single receive antenna ($H_q$) includes the determined channel estimates ($h_{lqp}$) between the receive antenna and each of the transmit antennas for each of the signal propagation paths. An analysis which illustrates the ability of the above described alternative approach to access all degree of freedom is as follows.

For purposes of the present analysis, the transmitted signal is defined as a time varying signal x(t) within which one or more data symbols are encoded. Because the transmitted signal can be transmitted from each of the one or more P transmit antennas, the transmitted signal x(t) is identified to include the sum of transmit signal components $x_1(t)$, $x_2(t)$, ..., $x_P(t)$ representative of the signal components being transmitted by each of the multiple transmit antennas.

$$x(t)=[x_1(t), x_2(t), \ldots, x_P(t)]^T \tag{2}$$

Conversely, the composite received signal over one symbol interval, including signal components from each of the receive antennas, is equal to the transmitted signal appropriately time shifted to account for the propagation signal path delay ($\tau$) multiplied by the inherent signal gain/loss (h) between the respective transmit and receive antennas summed across each signal path (l) plus a noise component (n(t)). In equation form the received signal is equal to:

$$r(t) = \begin{bmatrix} r_1(t) \\ \vdots \\ r_Q(t) \end{bmatrix} = \sum_{l=1}^{L} \begin{bmatrix} h_{l1}^T \\ \vdots \\ h_{lQ}^T \end{bmatrix} x(t-\eta) + n(t) \tag{3}$$

$$h_{lq}^T = [h_{lq1} \ \ldots \ h_{lqP}]. \tag{4}$$

The signal received at each receive antenna (q) can be written as:

$$r_q(t) = \sum_{l=1}^{L} h_{lq}^T \times (t-\eta) + n_q(t) \tag{5}$$

The same transmitted and received signals, when represented as a discretely sampled signal, viewed at a resolution corresponding to the chip interval can be alternatively represented as follows. Specifically, a portion of the signal waveform representative of a single symbol and transmitted at one of the transmit antennas, when viewed at a signal resolution corresponding to the chip interval has the following form.

$$x_p(t) = \sqrt{\rho} \, b \sum_{i=0}^{N-1} s_p[i]\omega(t-i/B), \, 0 \le t < T \tag{6}$$

where $\omega(t)$ is the (unit-energy) chip waveform of duration 1/B, $\rho$ is the transmit power, and the number of samples per symbol (N) corresponds to the symbol period (T) divided by the duration (1/B) of the chip waveform (N=TB). Here $s_p[i]$, i=0, 1, ..., N−1 represents the signature sequence transmitted through the p-th antenna. The signature sequence ($s_p$) can readily be represented as a signature code including a vector or sequence of samples.

$$s_p \stackrel{def}{=} [s_p[0], s_p[1], \ldots, s_p[N-1]]^T \tag{7}$$

Such a representation is possible without loss of information, because the number of samples per symbol (N) have been selected so that the path delays ($\tau$) are integer multiples of the duration (1/B) of the chip waveform. By combining the signature sequences ($s_p$) for all of the transmit antennas (P), a matrix S having N rows and P columns can be formed.

$$S \stackrel{def}{=} [s_1 \ \ldots \ s_P] \tag{8}$$

Similarly, the signal received at the receive antenna (q) is sampled at the rate (1/B) to enable discrete-time processing of the received signal without loss of information. By sampling the received signal at a signal resolution corresponding to the chip interval over one symbol duration, produces a vector or sequence of samples at the q-th antenna in the following form.

$$r_q \stackrel{def}{=} [r_q(0), r_q(1/B), \ldots, r_q((N-1)/B)]^T \tag{9}$$

Defining the chip interval so that the path delays can be represented as integer multiples of the chip interval additionally makes it conveniently possible to construct a time shift matrix ($\Delta_{dl}$) for each signal path. By assuming the corresponding path delay ($\tau$) to be cyclic, $\Delta_{dl}$ can be represented as a circulant matrix having N rows and N columns. Each row of the time shift matrix ($\Delta_{dl}$) includes a single entry corresponding to one of the columns having a value of one. The entries of the row corresponding to the other columns have a value of zero. The specific entry having the value of one in the first row of the time shift matrix ($\Delta_{dl}$) depends on the value of the integer multiple of the chip interval, which is equivalent to the delay. The specific column containing the value of one, corresponds to the column that is one plus the value of the integer multiple.

In subsequent rows of the time shift matrix ($\Delta_{dl}$), the column containing the value of one is shifted to the right by one column with respect to the location of the one in the immediately preceding row. Where the value of one appears in the last column in the preceding row, the value of one appears in the first column of the immediately subsequent row.

The time shift matrices ($\Delta_{dl}$) corresponding to each of the separate paths (L) can be combined to form a single time shift matrix. The single combined time shift matrix is formed by expanding the number of columns through the concatenation of the individual matrices. The single combined matrix ($\Delta$), in equation form, can be represented as follows:

$$\Delta \overset{def}{=} [\Delta_{d_1} \ldots \Delta_{d_L}] \tag{10}$$

By taking into account the transmitted waveform viewed at a signal resolution corresponding to the chip interval and the corresponding relationship between the transmitted and the received signals, the received signal can be represented as:

$$r_q = \sqrt{\rho} b \Delta (I_L \otimes aS) h_q + n_q \tag{11}$$

Here, $h_q$ is a vector formed by stacking the columns of the matrix $H_q$, which includes the channel estimates for a single receive antenna, and $n_q$ represents the noise component.

Defining $H_q = \Delta(H_q^T \otimes I_N)$ and applying the identity vec(AXB)=($B^T \otimes A$)vec(X) twice, results in:

$$r_q = \sqrt{\rho} b H_q s + n_q \tag{12}$$

where $n_q \sim N_c[0, \sigma^2 I_N]$.

For space-time channel decomposition, the overall space-time channel may be represented as $$H \overset{def}{=} [H_1^T \ldots H_Q^T]^T \in C^{NQ \times NP}.$$

The number of available space-time dimensions, $N_{dim}$, is precisely the rank of H. Since the channel coefficients $\{h_{lqp}\}$ are generally not perfectly correlated, $N_{dim} = N \times \min(P, Q)$. The goal is to design transceivers that access all $N_{dim}$ degrees of freedom in a way that different channel modes do not interfere with one another. This goal can be accomplished when a singular value decomposition (SVD) of H is available. This SVD has to be computed numerically since for Q>1, a closed-form SVD for H can not be obtained. Numerical computation is prohibitive in practice since N is usually large for wideband applications ($\geq 32$).

To overcome this problem, instead of using an SVD for H, a closed-form SVD for $H_q$ is derived. Then, via appropriate signaling and receiver designs, all $N_{dim}$ degrees of freedom can be accessed via non-interfering modes. The circulant structure of $\Delta_{d_l}$ is exploited to obtain a closed-form SVD for the q-th receive antenna space-time channel matrix $H_q$ in equation (12).

Theorem 1 is then established by defining:

$$c_n = \frac{1}{\sqrt{N}} [1 e^{j2\pi n/N} \ldots e^{j2\pi (N-1)n/N}]^T \in C^N, \tag{13}$$

$$g_{n,q} = [\Sigma_{l=1}^L h_{lq1} e^{-j2\pi nd_l/N} \ldots \Sigma_{l=1}^L h_{lqP} e^{-j2\pi nd_l/N}]^H \in C^P. \tag{14}$$

Then, $H_q \in C^{N \times NP}$ admits the following SVD:

$$H_q = \sum_{n=0}^{N-1} \sigma_{n,q} c_n v_{n,q}^H, \tag{15}$$

-continued $$\sigma_{n,q} = \|g_{n,q}\|, \; v_{n,q} = \frac{g_{n,q}}{\|g_{n,q}\|} \otimes c_n \tag{16}$$

The left singular vectors $\{C_n\}_{n=0}^{N-1}$ are independent of q since they are associated with temporal channel characteristics. Also, the p-th row of $g_{n,q}$ is the complex conjugate of the frequency response of the channel between the q-th receive and the p-th transmit antenna at frequency $$\frac{2\pi}{N} n.$$

Consider implementing the maximum likelihood or maximum ratio combining (MRC) receiver for the data b. The MRC receiver may be decomposed into two stages: front-end matched filtering with only the channel coefficients and combining across all received antennas, as denoted by $$\tilde{r} \overset{def}{=} \sum_{q=1}^Q H_q^H r_q,$$

followed by matched filtering with the signature code s. The N P-dimensional vector r is studied as it contains the channel coefficients. Substitute for $r_q$ to obtain $$r = \sqrt{\rho} b \left( \sum_{q=1}^Q H_q^H H_q \right) s + \sum_{q=1}^Q H_q^H n_q \tag{17}$$

Now apply Theorem 1 and identify $(X_1 \otimes X_2)(Y_1 \otimes Y_2) = X_1 Y_1 \otimes X_2 Y_2$ to show $$\sum_{q=1}^Q H_q^H H_q = \sum_{n=0}^{N-1} \Gamma_n \otimes c_n c_n^H \in C^{PN \times PN} \tag{18}$$

where $$\Gamma_n = \sum_{q=1}^Q g_{n,q} g_{n,q}^H \in C^{P \times P} \tag{19}$$

is the overall spatial mode matrix at frequency $$\frac{2\pi}{N} n.$$

Since the rank of $\Gamma_n$ in equation (19) is min (P,Q), it is clear from equation (18) that $\Sigma_{q=1}^Q H_q^H H_q$ is of rank $N_{dim} = N \times \min(P \times Q)$. Also, $\Sigma_{q=1}^Q H_q^H H_q = H^H H$ is the Grammian of H, hence rank $(\Sigma_{q=1}^Q H_q^H H_q) = $rank (H). It is easy to verify that the $N_{dim}$ eigenvectors of $(\Sigma_{q=1}^Q H_q^H H_q)$ are $$w^{((i-1)N+n)} \otimes c_n, n \in \{0, 1, \ldots, N-1\}, i \in \{1, 2, \ldots, \min(P, Q)\} \tag{20}$$

$$w^{((i-1)N+n)} = ev_i[\Gamma_n].$$

with the corresponding eigenvalues $\gamma_{(i-1)}N+n+1=\lambda_i[\Gamma_n]$. These $N_{dim}$ eigenmodes represent all the available non-interfering space-time sub-channels for any MRC based receiver. While a single data stream was assumed to motivate the MRC receiver structure, in general $N_{dim}$ non-interfering data stream can be transmitted in parallel using the $N_{dim}$ eigenmodes of $(\Sigma_{q=1}^Q H_q^H H_q)$. Each of these streams can be demodulated using the MRC receiver described above. This issue will also be discussed below.

Notice that to compute all the eigenvectors in equation (20), the most costly operation is finding the eigenvectors of N matrices, each with the size of P×P. This is much less complex than computing the singular modes of the NQ×NP matrix H since N is typically large ($\geq 32$) and P is typically small (currently 2) in practice.

For a minimum BER single-user system, minimum BER is obtained by transmitting only a single data stream via the most dominant sub-channel. In this case, $$s = w \otimes c_{\bar{n}} \quad (21)$$

where $$w = ev_1[\Gamma_{\bar{n}}], \bar{n} = \arg\max_{n=0,\ldots,N-1} \lambda_1[\Gamma_n]. \quad (22)$$

Figure 8:
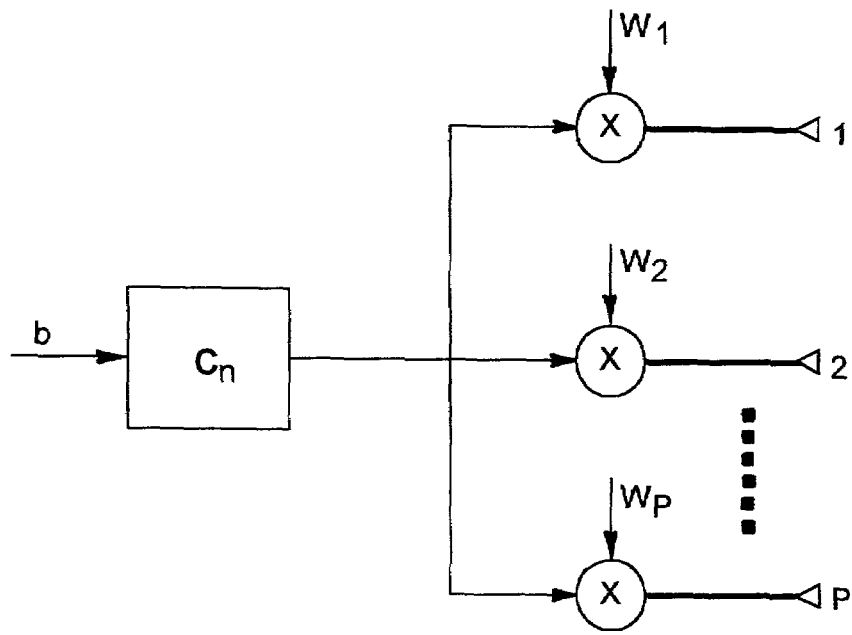
FIG. 8 is an exemplary block diagram of a single-user minimum BER according to another embodiment.

That is, $\bar{n}$ is the frequency of the spatial mode matrix $\Gamma_n$ with the largest dominant eigenvalue and w is the corresponding dominant eigenvector. Notice that only one dimension is used in any one symbol duration to achieve minimum BER. This signaling scheme can be implemented as shown in FIG. 8 with $n=\bar{n}$.

For receiver design, assume BPSK modulation ($b \in \{\pm 1\}$), although extension to other modulation schemes is straightforward. The MRC receiver computes r in equation (17) and then correlates r with $s=w \otimes c_{\bar{n}}$ to obtain the decision statistic Z for b. To simplify receiver complexity, exploit Theorem 1 as follows. Using the identity $(X_1 \otimes X_2)(Y_1 \otimes Y_2)=X_1 Y_1 \otimes X_2 Y_2$ and the orthogonality of $\{c_n\}_{n=0}^{N-1}$ that $$H_q(w \otimes c_{\bar{n}}) = (g_{\bar{n},q}^H w) c_{\bar{n}} \quad (23)$$

Hence, Z can be written as follows:

$$Z = (w \otimes c_{\bar{n}})^H \sum_{q=1}^Q H_q^H r_q = \sum_{q=1}^Q (w^H g_{\bar{n},q}) c_{\bar{n}}^H r_q. \quad (24)$$

Figure 9:
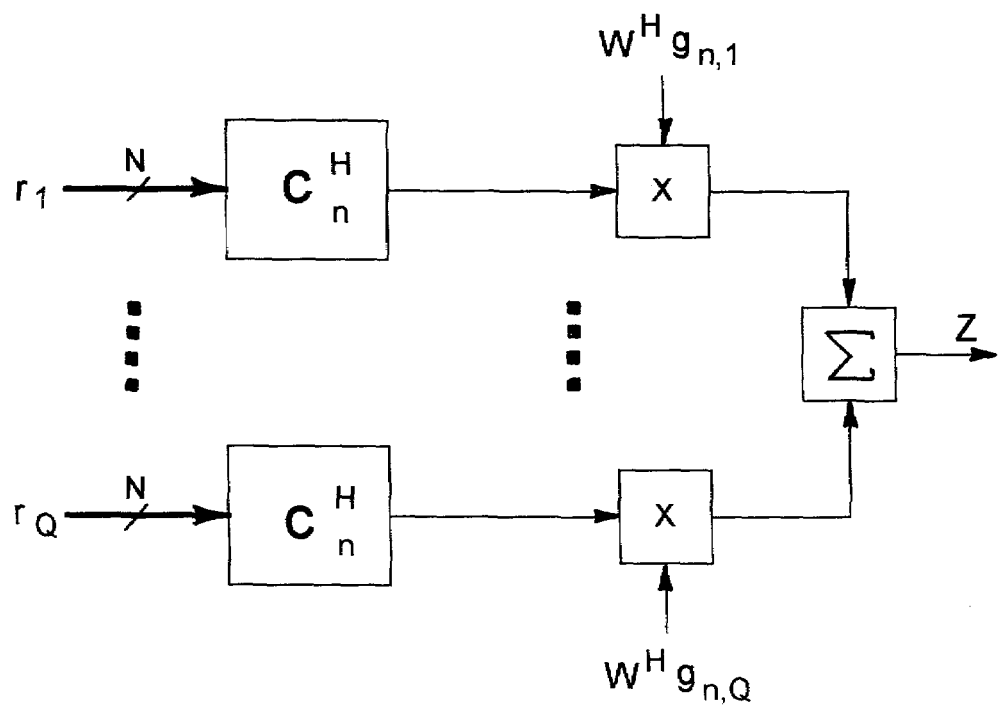
FIG. 9 is an exemplary block diagram of a single-user minimum BER according to another embodiment.

This can be implemented as shown in FIG. 9 with $n=\bar{n}$. Note that $\{g_{n,q}\}$, which represents the CSI, and the transmit beamformer w need to be known at the receiver. For BPSK modulation, the maximum likelihood detector is $\hat{b}=\text{sgn}(\text{Re}\{Z\})$. In this case, according to $$Q(x) = \frac{1}{\sqrt{2\pi}} \int_x^\infty e^{-u^2/2} du, \quad (25)$$

$$BER_{min} = Q\left(\sqrt{\frac{2\rho}{\sigma^2} w^H \left(\sum_{q=1}^Q g_{\bar{n},q} g_{\bar{n},q}^H\right) w}\right)$$

Choosing $s=w \otimes c_{\bar{n}}$ with w defined in equation (22) maximizes the argument of $Q(\sqrt{.})$ and therefore the BER is minimized. The effective SNR is $$\frac{\rho}{\sigma^2} \lambda_1[\Gamma_{\bar{n}}],$$

so $\lambda_1[\Gamma_{\bar{n}}]$ is the gain of the dominant sub-channel.

The values of $\{g_{n,q}\}$, $\bar{n}$, and w are generally available at both the transmitter and receiver. In practice, theis availability can depend on the system constraints. For TDD systems, $\{g_{n,q}\}$, $\bar{n}$, and w can be computed at the transmitter and signaled to the receiver by exploiting reciprocity. Alternatively, $\bar{n}$, and w can be computed at the receiver for front-end processing. In FDD systems, reciprocity does not hold, hence CSI needs to be signaled to the transmitter via a feedback channel. In order to reduce feedback overhead, the receiver may computer $\bar{n}$, and w and feed them back to the transmitter rather than feeding back CSI.

For high throughput single-user systems, since a fixed modulation scheme can be assumed, the throughput of the systems is determined by the number of streams transmitted simultaneously. To transmit M data streams via the channel, we choose a transmitted signal of the form:

$$\sum_{m=1}^M \sqrt{\rho_m} b_m s^{(m)}, \quad (26)$$

where the signature codes $\{s^{(m)}\}$ are chosen to be a subset of the eigenvectors of $$\sum_{q=1}^Q H_q^H H_q,$$

given in equation (20). Define the relative throughput of a system as the total system throughput relative to the throughput of a one-stream system with the same modulation scheme. The relative throughput M is bounded by $N_{dim}$, the maximum number of parallel sub-channels. Without loss of generality, assume that $\sigma^2=1$ for present analysis. That is, $\rho_m$ is the transmit power for the m-th stream normalized with respect to the noise variance ($\sigma^2$). At the receiver, different streams are easily separated due to the orthoginality of $\{s^{(m)}\}$. The transmitter and receiver for this maximum throughput scheme may be implemented as shown in FIGS. 8 and 9, respectively, for each data stream with n and w chosen accordingly.

Throughput is maximized by using all the $N_{dim}$ spatio-temporal dimensions for data transmission as discussed above. However, for a fixed total transmitted power, this comes at the expense of BER since the power has to be distributed between $N_{dim}$ streams. Hence there is a trade-off between throughput and BER. Throughput may be traded for lower BER by choosing to transmit with M<$N_{dim}$ data streams. Since perfect CSI is available at the transmitter, the sub-channel gains (eigenvalues) $\{\gamma_m\}_{m=1}^{N_{dim}}$ defined above can be determined. Without loss of generality, assume that:

$$\gamma_1 \geq \gamma_2 \geq \ldots \gamma_M \geq \gamma_{M+1} \geq \ldots \geq \gamma_{N_{dim}} > 0 \quad (27)$$

where the non-zero gain assumption is achieved. Clearly, the most power efficient way to achieve a relative throughput of M is to use the M sub-channels with the highest gains. The effective BER of an M-stream system is defined as:

$$BER_{eff}^{(M)} \overset{def}{=} \frac{1}{M} \sum_{m=1}^{M} BER(\rho_m \gamma_m). \quad (28)$$

where $\rho_m \gamma_m$ is the received SNR corresponding to the m-th stream. $BER(\rho_m \gamma_m)$ is a strictly decreasing function of the received SNR, and depends on the chosen modulation scheme. The effective BER reflects the average system performance across M sub-channels. The transmit power allocated for all streams $\{\rho_m\}_{m=1}^M$ is assumed to satisfy the constraint $\Sigma_{m=1}^M \rho_m = \rho_{TOT}$. In general, $\rho_m$ is chosen based on the sub-channel gains $\{\gamma_m\}_{m=1}^M$. To achieve relative throughput of M, $\rho_m > 0$ is required for all $m \in \{1, 2, \ldots, M\}$.

A power allocation scheme that minimizes the effective BER for a fixed throughput (M) is disclosed below. This scheme further leads to a strategy to maximize the instantaneous throughput for a given worst-case BER requirement.

Assume BPSK or QPSK modulation, so that $BER(\rho_m \gamma_m) = \mathcal{Q}(\sqrt{2\rho_m \gamma_m})$. The results presented below can be extended to other modulation schemes. For a given relative throughput of M, choose $\{\rho_m\}_{m=1}^M$ to minimize $BER_{eff}^{(M)}$. Since the effective BER reflects the average performance over all sub-channels, it may result in some sub-channels with extremely high and some with extremely low received SNR $\rho_m \gamma_m$ being used for data transmission. This effect is more pronounced when the total transmit power $\rho_{TOT}$ is low. To prevent this, impose a worst-case SNR constraint resulting in the following optimization problem:

$$\{\bar{\rho}_m\}_{m=1}^M = \arg\min_{\rho_1 \ldots \rho_M} \sum_{m=1}^{M} Q(\sqrt{2\rho_m \gamma_m}) \quad (29)$$

$$s.t. \sum_{m=1}^{M} \rho_m = \rho_{TOT}, \quad (30)$$

$$\rho_m \gamma_m \geq c_m, m=1, \ldots, M. \quad (31)$$

The constant $c_m$ is chosen such that $\mathcal{Q}(\sqrt{2c_m})$ is the worst-case BER for sub-channel m.

The above optimization problem can be solved via Kuhn-Tucker conditions. Thus, a solution exists if and only if:

$$\rho_{TOT} \geq \rho_{co,M}, \rho_{co,M} = \sum_{m=1}^{M} \frac{c_m}{\gamma_m} \quad (32)$$

where $\rho_{co,M}$ denotes the cut-off transmit power for a relative throughput of M. When equation (32) is met, the solution is unique and characterized by:

$$\bar{\rho}_m = \max\left(\frac{c_m}{\gamma_m}, \rho_m\right), \quad (33)$$

where $\rho_m$ satisfies:

$$\sqrt{\frac{\gamma_m}{\rho_m}} \times \exp(-\rho_m \gamma_m) = \bar{\mu}, m = 1, \ldots, M \quad (34)$$

and $\bar{\mu}$ is chosen such that $\Sigma_{m=1}^M \bar{\rho}_m = \rho_{TOT}$. Furthermore, for a given total transmit power $\rho_{TOT}$ and sub-channel SNR values $\{\gamma_m\}_{m=1}^{N_{dim}}$, the minimum effective BER power allocation results in:

$$BER_{eff}^{(M)} \leq BER_{eff}^{(M+1)}. \quad (35)$$

provided that $\{c_m\}_{m=1}^M$ is a constant or decreasing sequence.

Hence, to maintain a relative throughput of M for different channel realizations, the total power $\rho_{TOT}$ may need to be adjusted accordingly. The property represented by equation (35) demonstrates the trade-off between BER and throughput. That is, higher throughput results in higher effective BER. Although this property is intuitively pleasing, it is generally not true for arbitrary power allocation schemes.

The solution of equation (34) must be obtained numerically. An iterative procedure may be used to obtain the solution of equations (33) and (34). Starting with an arbitrary $\bar{\mu}$, equation (34) is solved numerically for $\{\bar{\rho}_m\}_{m=1}^M$. A unique solution is guaranteed for any value of $\bar{\mu}$. If $$\sum_{m=1}^{M} \bar{\rho}_m > \rho_{TOT},$$

$\bar{\mu}$ is increased to reduce each $\bar{\rho}_m$. Similarly, if $\Sigma_{m=1}^M \bar{\rho}_m \leq \rho_{TOT}$, $\mu$ is lowered to increase each $\bar{\rho}_m$. This procedure is repeated until $\Sigma_{m=1}^M \bar{\rho}_m = \rho_{TOT}$ is satisfied within a prescribed numerical tolerance.

An approximate solution can be obtained by replacing the exact BER for each sub-channel in equation (29) with its Chernoff bound. In this case, we minimize the following upper bound on the effective BER:

$$BER_{eff}^{(M)} \leq \frac{1}{2M} \sum_{m=1}^{M} \exp(-\rho_m \gamma_m).$$

This approximation is accurate for sufficiently large $\rho_{TOT}$. Again, using Kuhn-Tucker conditions the following closed-form solution is obtained for $\rho_m, m=1, \ldots, M$ assuming equation (32) holds:

$$\tilde{\rho}_m = \frac{\max(c_m, \log \gamma_m - \tilde{\mu})}{\gamma_m} \quad (36)$$

where $\tilde{\mu}$ is chosen to satisfy the power constraint $\Sigma_{m=1}^M \tilde{\rho}_m = \rho_{TOT}$. This solution is termed the Chernoff-based power allocation. Analogous to the exact solution, it can be shown that $BER_{eff}^{(M)} \leq BER_{eff}^{(M+1)}$ holds in this case as well.

When $\rho_{TOT}$ is sufficiently large, it is easy to see that the worst-case sub-channel BER constraint in equation (31) is not active. In this case, the exact solution to equation (29) is $\bar{\rho}_m = \rho_m$ for all m, where $\rho_m$ is given in equation (34). The Chernoff-based solution is simply $\rho_m = \frac{\log \gamma_m - \tilde{\mu}}{\gamma_m}$.

Another simple sub-optimal power allocation scheme that satisfies the constraints in equations (30) and (31), assuming equation (32) holds, can be obtained as follows:

$$\hat{\rho}_m = \frac{c_m}{\gamma_m} + \frac{1}{M}(\rho_{TOT} - \rho_{co,M}). \quad (37)$$

That is, after satisfying the minimum SNR constraint in each sub-channel, the remaining power is distributed equally for all sub-channels. This scheme is termed uniform power allocation. It is easy to see that $BER_{eff}^{(M)} \leq BER_{eff}^{(M+1)}$ holds for uniform power allocation.

For maximum throughput criterion, now consider an adaptive throughput scheme where the instantaneous relative throughput is maximized subject to constraints in equations (30) and (31). Let the set of "allowable" relative throughput be $\mathcal{M}$ with $0 \in \mathcal{M}$. This is intended to allow "no-transmission" when the channel undergoes such deep fades that the BER requirement cannot be achieved for a given $\rho_{TOT}$. The solution of this problem is simply choosing the largest M such that:

$$\rho_{co,M} \leq \rho TOT \quad (38)$$

still holds for each channel realization.

Note that the maximum throughput criterion is not coupled to any sub-channel power allocation scheme but only requires $$\rho_m \leq \frac{c_m}{\gamma_m}.$$

Thus, one may use the minimum effective BER or uniform allocation scheme described above to choose the $\rho_m$.

For all the examples discussed below, we consider a P=Q=2 and N=16 system. There are L=3 paths with $d_l \in \{0, 1, 2\}$. The channel coefficients $\{h_{lqp}\}$ are assumed IID and $N_c[0, 1/QL]$ (Rayleigh fading). To illustrate the fixed throughput criterion, we consider M=32. The system is required to achieve the same worst-case BER of $\epsilon$ on each sub-channel. Hence, $$c_m (\mathcal{Q}^{-1}(\epsilon))^2/2, m=1, \ldots, M$$

where $\mathcal{Q}^{-1}(x)$ is the inverse of $\mathcal{Q}(x)$.

Figure 10:
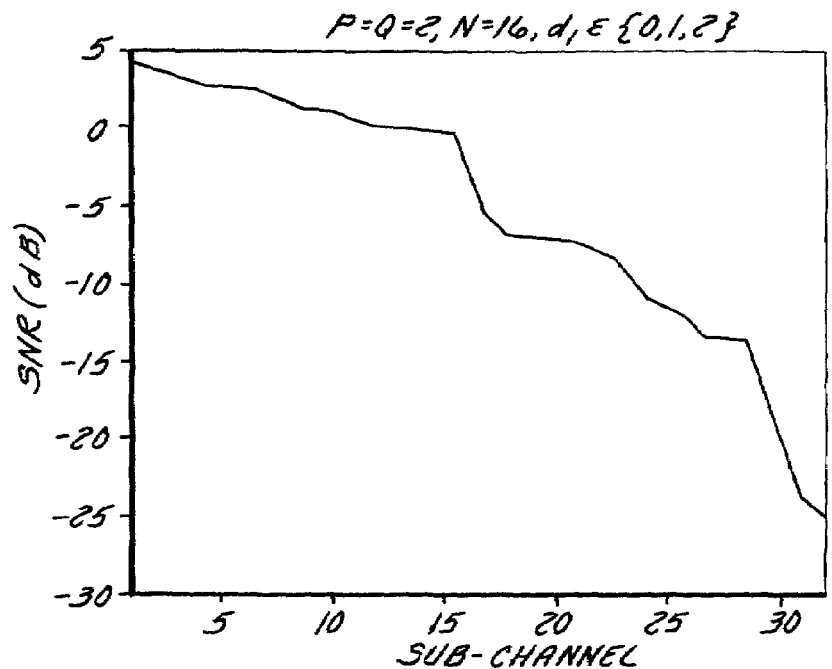
FIG. 10 is an exemplary illustration of sorted sub-channel SNR values according to one embodiment.
Figure 11:
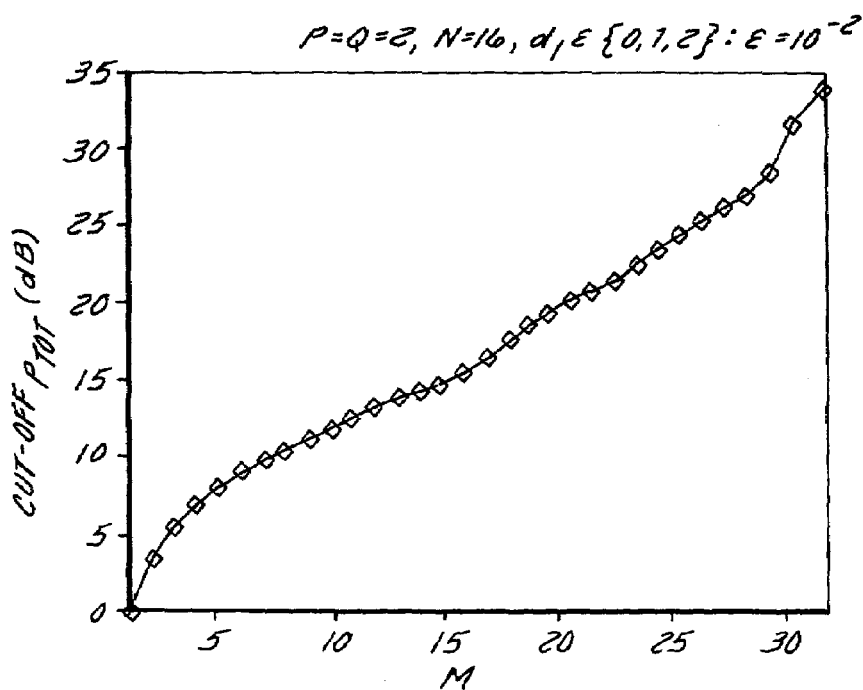
FIG. 11 is an exemplary illustration of cut-off power according to one embodiment.
Figure 12:
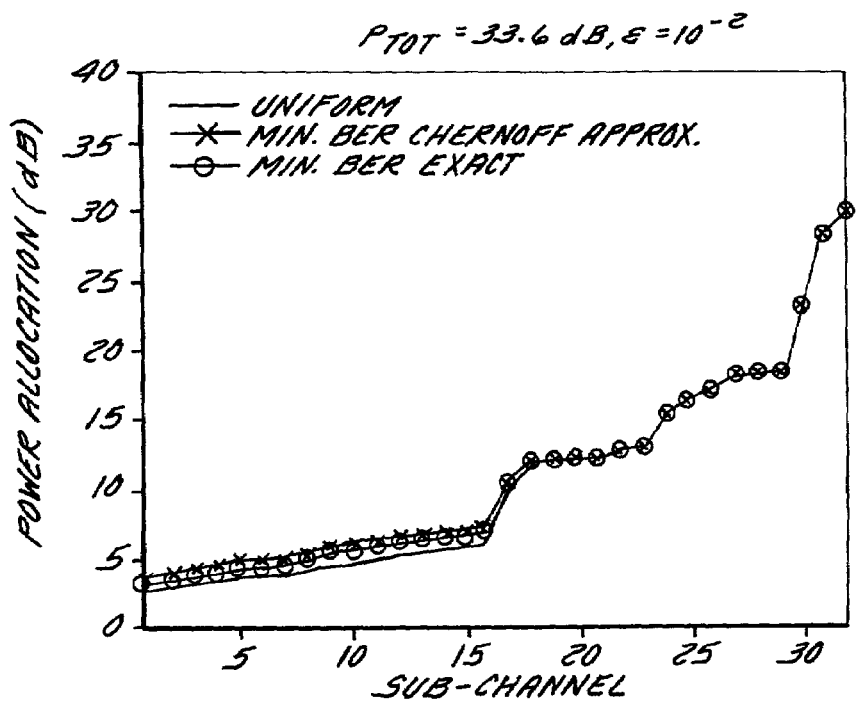
FIGS. 12–15 are exemplary illustrations of allocation of power and resulting BER across sub-channels according to one embodiment.
Figure 13:
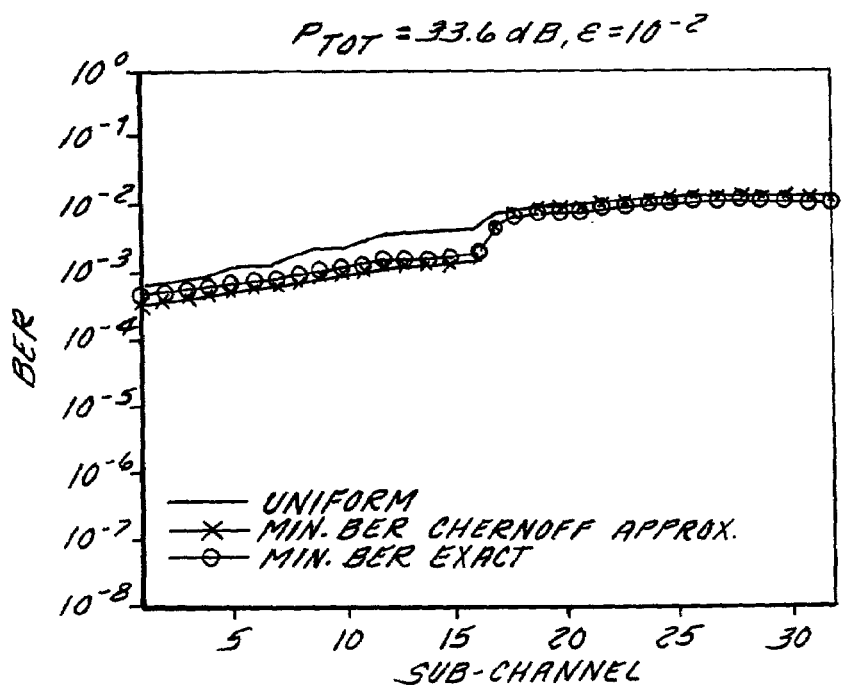
Figure 14:
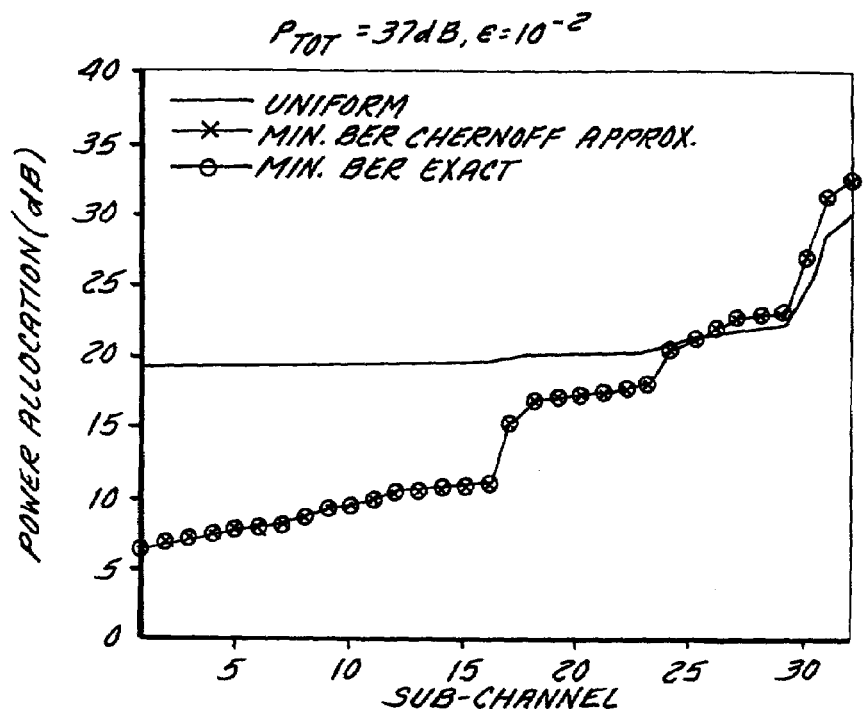
Figure 15:
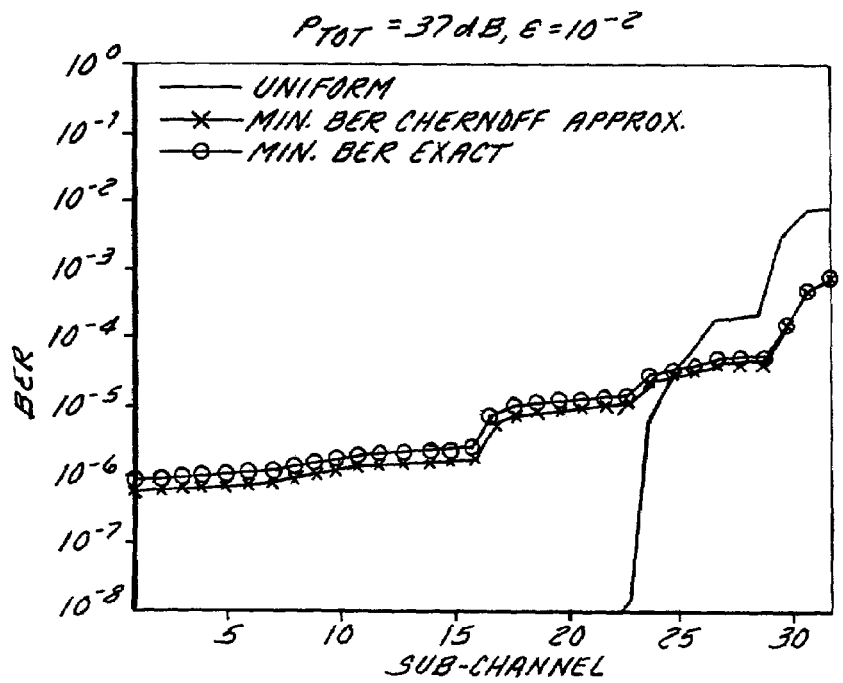

First compare the minimum effective BER power allocation (based on the exact and Chernoff-bounded effective BER) to uniform power allocation. One channel realization and $\epsilon=10^{-2}$ are used. The resulting sorted sub-channel SNR values and the cut-off transmit power $\rho_{co,M}$ as a function of M are depicted in FIGS. 10 and 11 respectively. For M=32, which implies $\rho_{TOT} \geq 33.54$ dB is required to satisfy the worst-case BER constraint. The allocation of power and resulting BER across sub-channels for $\rho_{TOT}=33.6$ and 37 dB are depicted in FIGS. 12–15. From this example, the following observations can be made:

First, the Chernoff-based solution is virtually identical to the exact minimum effective BER solution. The difference between the minimum effective BER and uniform power allocation schemes is small when PWT is close to the minimum value 33.54 dB. The difference is more pronounced when excess power is available.

Second, both the minimum BER and uniform power allocation schemes allocate relatively more power to sub-channels with low gain. However, as evident from FIGS. 13 and 15, the received SNR $\rho_m \gamma_m$ is largest in the sub-channels with the largest channel gain $\gamma_m$. Notice that the minimum effective BER solution tends to allocate more power to sub-channels with low channel gain than does the uniform scheme, which results in lower effective BER.

Finally, the worst-case sub-channel BER constraint in equation (31) is active only for low $\rho_{TOT}$. This is evident from FIGS. 14 and 15. The sub-channel BER values for $\rho_{TOT}=37$ dB fall below $10^{-2}$, which indicate that $\rho_m \gamma_m > c_m$ for all m.

Figure 16:
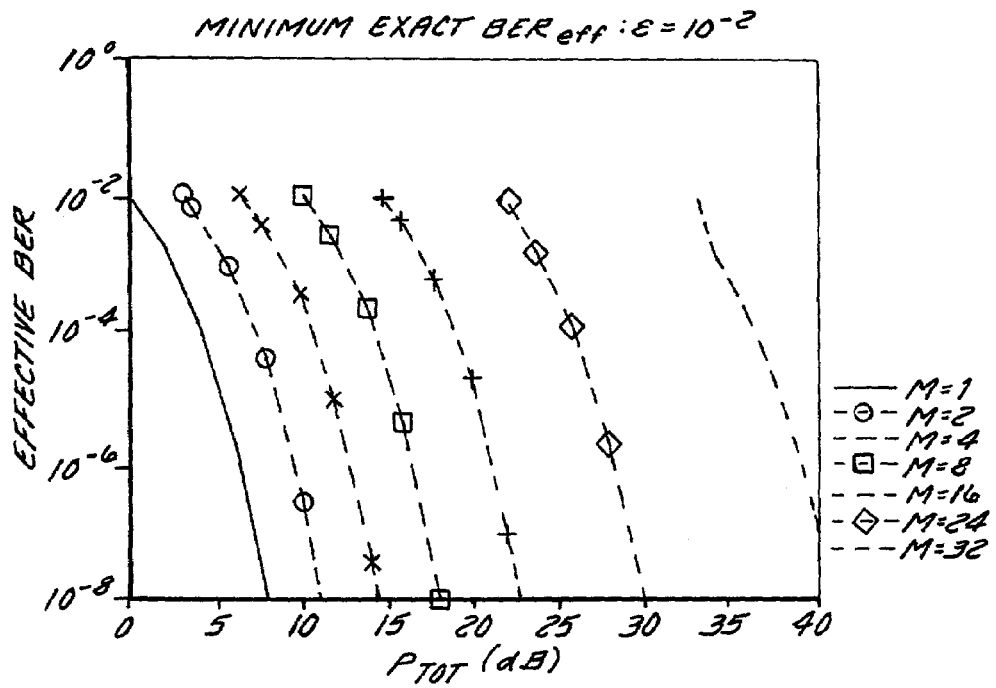
FIG. 16 is an exemplary illustration of an effective BER according to another embodiment.
Figure 17:
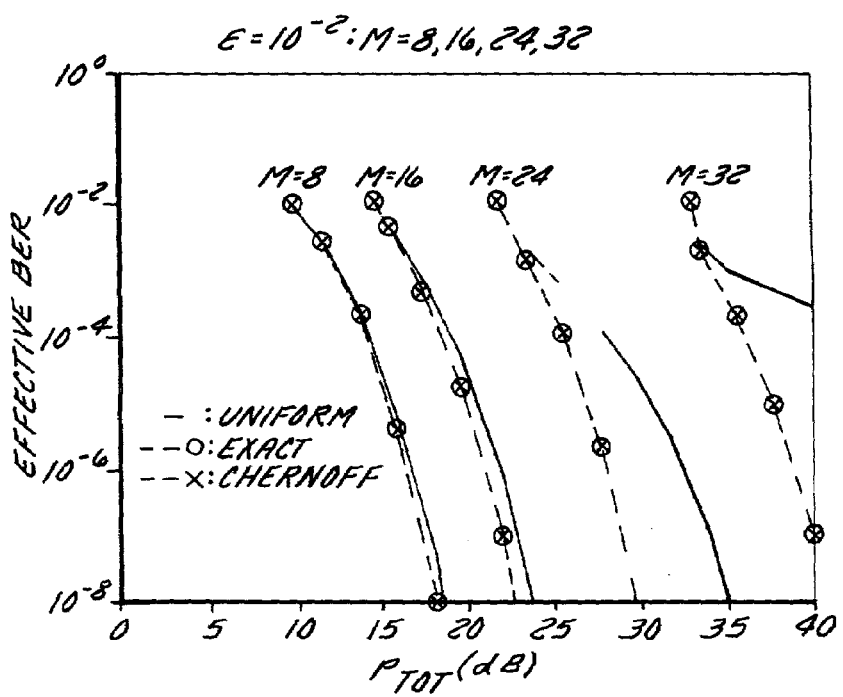
FIG. 17 is an exemplary illustration of a comparison of power allocation schemes.
Figure 18:
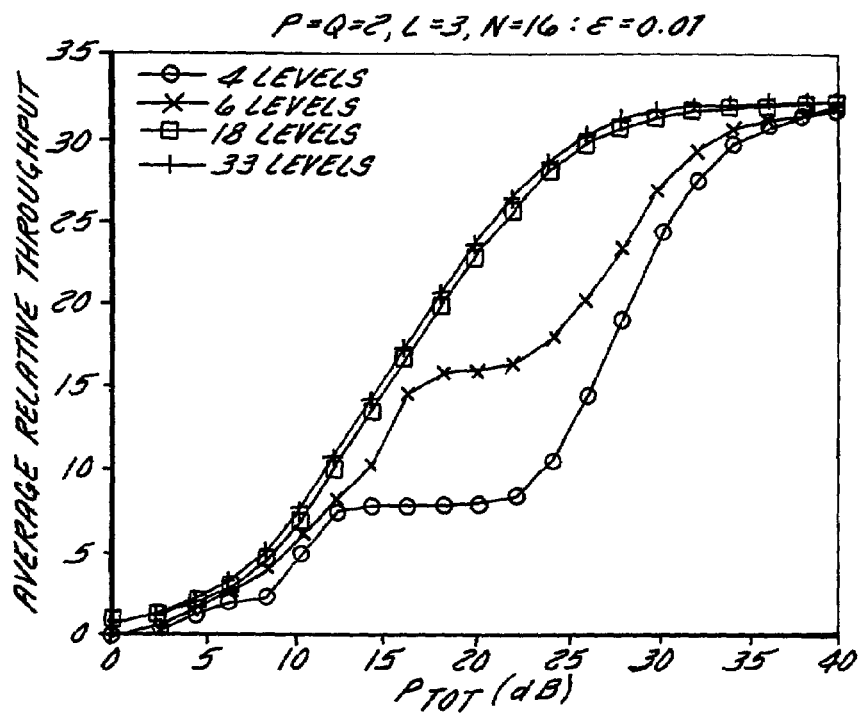
FIGS. 18–21 are exemplary illustrations of average relative throughput and average BER.
Figure 19:
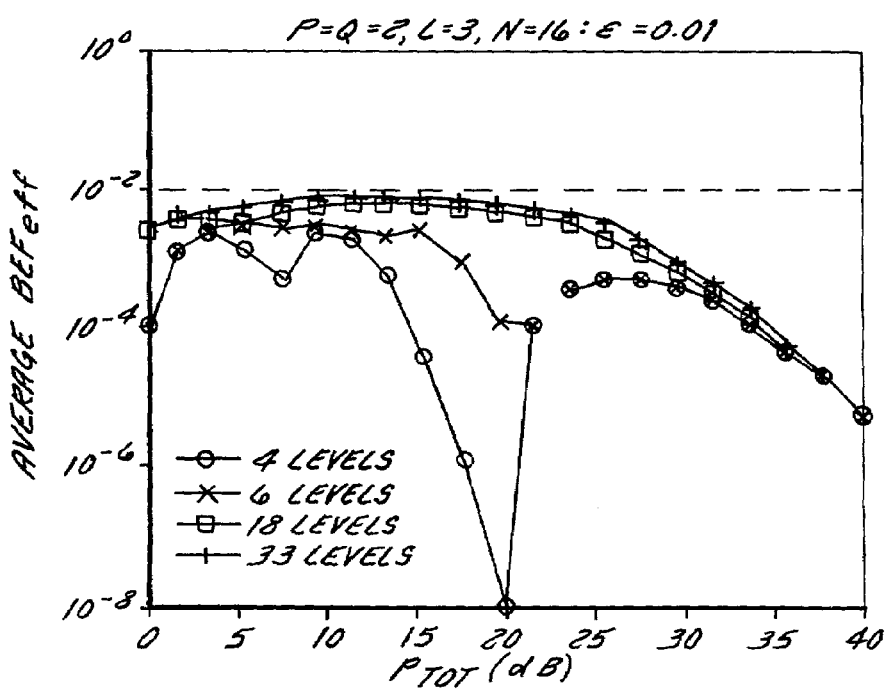
Figure 20:
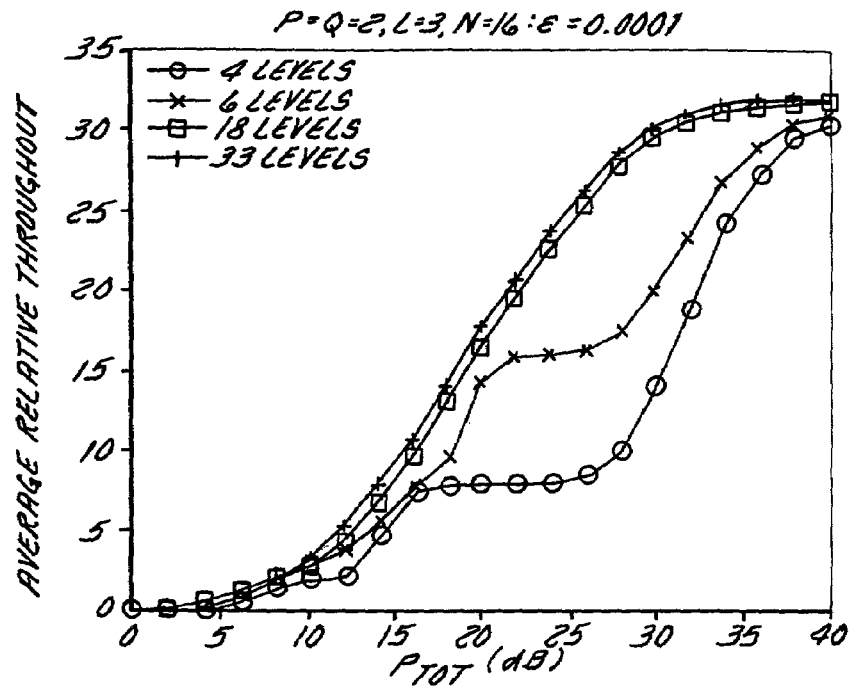
Figure 21:
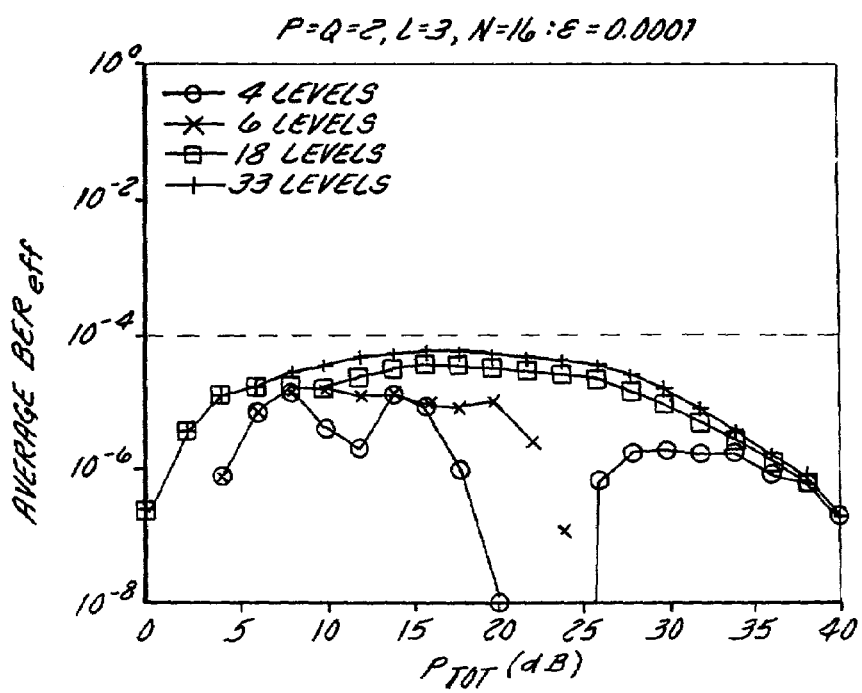

The effective BER for different M is displayed in FIG. 16 as a function of $\rho_{TOT}$ using the same channel realization and exact minimum effective BER solution. A comparison to the effective BER obtained using Chernoff bound and uniform power allocations is shown in FIG. 17. Observe that the loss of performance due to uniform power allocation compared to the minimum effective BER solution is more pronounced as M increases. Also, the Chernoff approximation introduces negligible performance loss.

To demonstrate the notation of adaptive throughput, we assume $\epsilon=10^{-2}$ and $10^{-4}$ worst-case BER requirements and use the Chernoff-bound power allocation scheme. Four different sets of allowable relative throughputs are used:

| | |
|---|---|
| $M_1 = \{0, 2, 8, 32\}$ | (4 levels) |
| $M_2 = \{0, 2, 4, 8, 16, 32\}$ | (6 levels) |
| $M_3 = \{0, 1, 2, 4, 6, 8, \ldots, 30, 32\}$ | (18 levels) |
| $M_4 = \{0, 1, 2, 3, \ldots, 31, 32\}$ | (33 levels) |

The resulting average relative throughput and average $BER_{eff}$ are depicted in FIGS. 18–21. The averages were computed over 500 channel realizations. Observe that larger sets result in better average throughput for any $\rho_{TOT}$ and the resulting BER profiles are loser to the worst-case requirement. With small sets excess power tends to reduce the effective BER rather than increase the number of channels, while with the larger sets increases in $\rho_{TOT}$ tend to increase the number of channels, rather than reduce average $BER_{eff}$. Also, decreasing the worst-case BER results in a decrease in throughput as more power is needed to achieve a certain throughput.

For multi-user systems, for a general multistream system with K active users, the sampled signal at the q-th receive antenna $r_q$ in equation (12) can be written as:

$$r_q = \sum_{K=0}^{K-1} H_q^{(k)} \sum_{m=1}^{M_k} \sqrt{\rho_{m,k}} \, b_{m,k} s^{(m,k)} + n_q, \quad (39)$$

where $H_q^{(k)} = \Delta^{(k)}(H_q^{(k)T} \otimes I_N)$ and the index k denotes the k-th user. Here the k-th user transmits $M_k$ data streams. Note that in general the signal transmitted by different users see different channels. It is easy to show that the SVD of $H^{q(k)} \in C^{N \times NP}$ in Theorem 1 can be written as:

$$H_q^{(k)} = \sum_{n=0}^{N-1} c_n (g_{n,q}^{(k)} \otimes c_n)^H, \quad (40)$$

where the p-th row of $g_{n,q}^{(k)}$ is the complex conjugate of frequency response of the k-th user channel between the q-th receive and p-th transmit antenna at frequency $$\frac{2\pi}{N}n.$$

In this embodiment, we demonstrate that up to N users an be accommodated without resulting in multi-access interference. This is possible by exploiting the left singular vectors $\{c_n\}_{n=0}^{N-1}$ which are independent of the channels of different users. Choose $s^{(m,k)} = w^{(m,\pi(k))} \otimes c_{\pi(k)}$, where $\pi(k)\}_{k=0}^{K-1}$ can be any arbitrary permutation of $\{0, 1, \ldots, K-1\}$. Here, $\pi(k)$ represents the frequency assignment for different users. For simplicity, we choose $\pi(k)=k$. analogous to equation (23), we have from equations (39) and (40):

$$r_q = \sum_{k=0}^{K-1} c_k \sum_{m=1}^{M_k} \sqrt{\rho_{m,k}} \, b_{m,k} \left( g_{k,q}^{(k)H} w^{(m,k)} \right) + n_q. \quad (41)$$

Since $\{c_k\}_{k=0}^{K-1}$ are orthogonal, perfect user separation can be achieved without using a decorrelating detector at the receiver. It is apparent that the separation of users is achieved using only the N orthogonal temporal dimensions. In general, spatial dimensions can not be used for separating users because different users generally have different channel coefficients. After this temporal frequency assignment, each user has min(P, Q) different spatial dimensions. These available spatial dimensions may be used to increase throughput and/or minimize BER by deriving the appropriate spatial beamformers.

Suppose the maximum number of users K=N is desired. The transmitter and receiver structure in FIGS. 8 and 9 may be employed for each user (or each user's data stream) with $c_n = c_k$, $w = w^{(m,k)}$, and $g_{m,q} = g_{k,q}^{(k)}$. Denote the test statistic for data stream m of user k' as $Z^{(m,k')}$, which can be written as:

$$Z^{(m,k')} \sum_{m=1}^{M_{k'}} \sqrt{\rho_{m,k'}} \, b_{m,k'} w^{(m,k)H} \left( \sum_{q=1}^{Q} g_{k',q}^{(k')} g_{k',q}^{(k')H} \right) w^{(m,k')} +$$

$$w^{(m,k')H} \sum_{q=1}^{Q} g_{k',q}^{(k')} c_k^H n_q$$

The spatial beamformer $w^{(m,k')}$ may be chosen to optimize the k'-th user's BER, throughput, or a combination between the two.

If the number of users K<N, then temporal dimensions can also be used to increase each user's throughput and/or minimize BER. In this case, user k is assigned to min (P, Q)×$N_{T,k}$ dimensions, where $N_{T,k}$ is the number of temporal dimensions (frequencies) for user k and $\Sigma_{k=0}^{K-1} N_{T,k} \leq N$.

As noted, user separation in this framework is a result of the channel's temporal eigenstructure. The temporal eigenstructure is independent of the channel realization and hence, is common to all users. This implies that imperfect CSI at the transmitter and/or receiver will not affect multi-user separation. Each user, however, will incur some performance loss due to imperfection in the spatial beamformer if perfect CSI is not available. This also implies that multi-user separation can be achieved without the availability of CSI at the transmitter. This is analogous to the use of sinusoids for multi-user separation in OFDMA systems.

The perfect multi-user separation property also implies that the signaling and receiver design for each user do not require any channel or signaling information of other users. This greatly simplifies system design. For example, each user's total transmit power $\rho_{TOT}^{(k)}$ may be independently adjusted. Thus, CSI at the transmitter can be utilized to adjust the amount of transmitted power $\{\rho_{1,k}, \ldots, \rho_{M_k,k}\}_{k=0}^{K-1}$ to achieve a certain target BER or SNR for each user.

According to the present invention, an orthogonal decomposition of a general space-time multi-antenna multipath channel is derived and utilized to design efficient signaling strategies and the corresponding receiver structures. The decomposition explicitly characterizes N×min(P, Q) available non-interfering spatio-temporal dimensions in the channel. The time bandwidth product N represents the number of available temporal dimensions. The number of available spatial dimensions is min(P, Q), where P and Q are the number of transmit and receive antennas, respectively. This decomposition provides a framework to jointly address system design for minimum BER, maximum throughput, multi-user applications, as well as the combination of the three, provided channel state information (CSI) is available at the transmitter. For a fixed throughput system, a power allocation scheme that minimizes the instantaneous effective BER of a multistream transmission is derived. In addition, a strategy to maximize the system throughput given a worst-case BER requirement and is proposed. For multi-user applications, analogous to OFDMA systems, the proposed scheme possesses a perfect multi-user separation property as a result of the common temporal eigenstructure across all channels.

Figure 22:
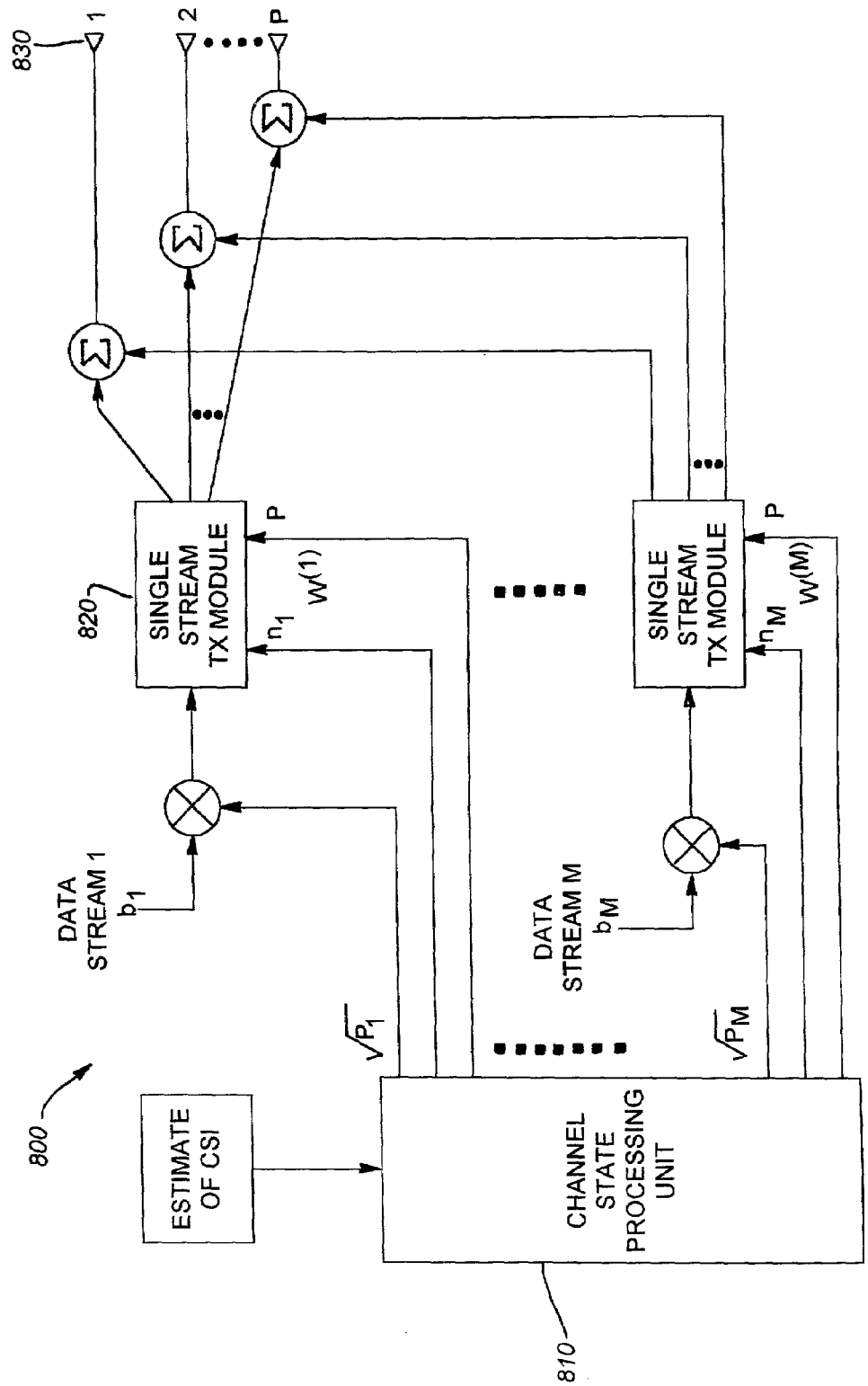
FIG. 22 is an exemplary block diagram of a general single-user multistream transmitter according to one embodiment.

FIGS. 22–25 illustrate alternative embodiments to the transmitter 10 illustrated in FIG. 1 and receiver 40 illustrated in FIG. 4. Accordingly, FIG. 22 is an exemplary block diagram of a general single-user mutistream transmitter 800. The transmitter 800 includes a channel state processing unit 810, a plurality of single stream transmitter modules 820, and a plurality of antennas 830. The transmitter 800 operates in a similar manner to the transmitter 10. For example, an estimate of the channel state information (CSI) is input into the channel state processing unit 810. As described above, each single stream transmitter module 820 receives its own frequency index, set of beamformer weights, and data streams for transmission. The signal outputs from each transmitter module 820 is summed together before transmission by a specific antenna 830.

Figure 23:
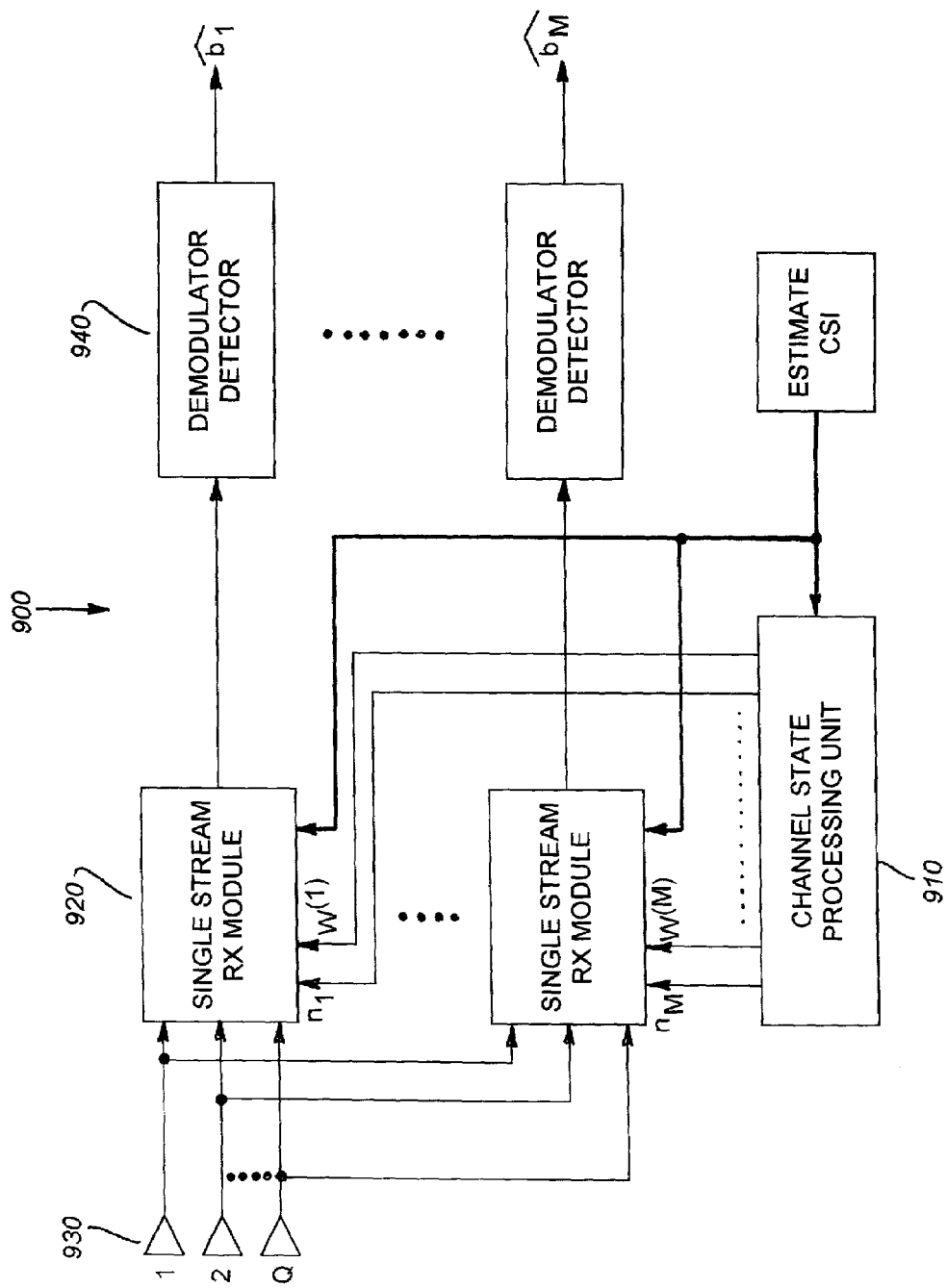
FIG. 23 is an exemplary block diagram of a general single-user multistream receiver according to one embodiment.

FIG. 23 is an exemplary block diagram of a general single-user mutistream receiver 900. The receiver 900 includes a channel state processing unit 910, a plurality of single stream receiver modules 920, a plurality of antennas 930 and a plurality of demodulator detectors 940. The receiver 900 operates in a similar manner to the receiver 40. For example, an estimate of the CSI is input into the channel state processing unit 910. Each single stream receiver module 920 receives its own frequency index, set of beamformer weights, and data streams for reception of the signal via the antennas 930. The signals are then coupled to the demodulator/detectors 940 which convert the signals to streams of data symbols.

Figure 24:
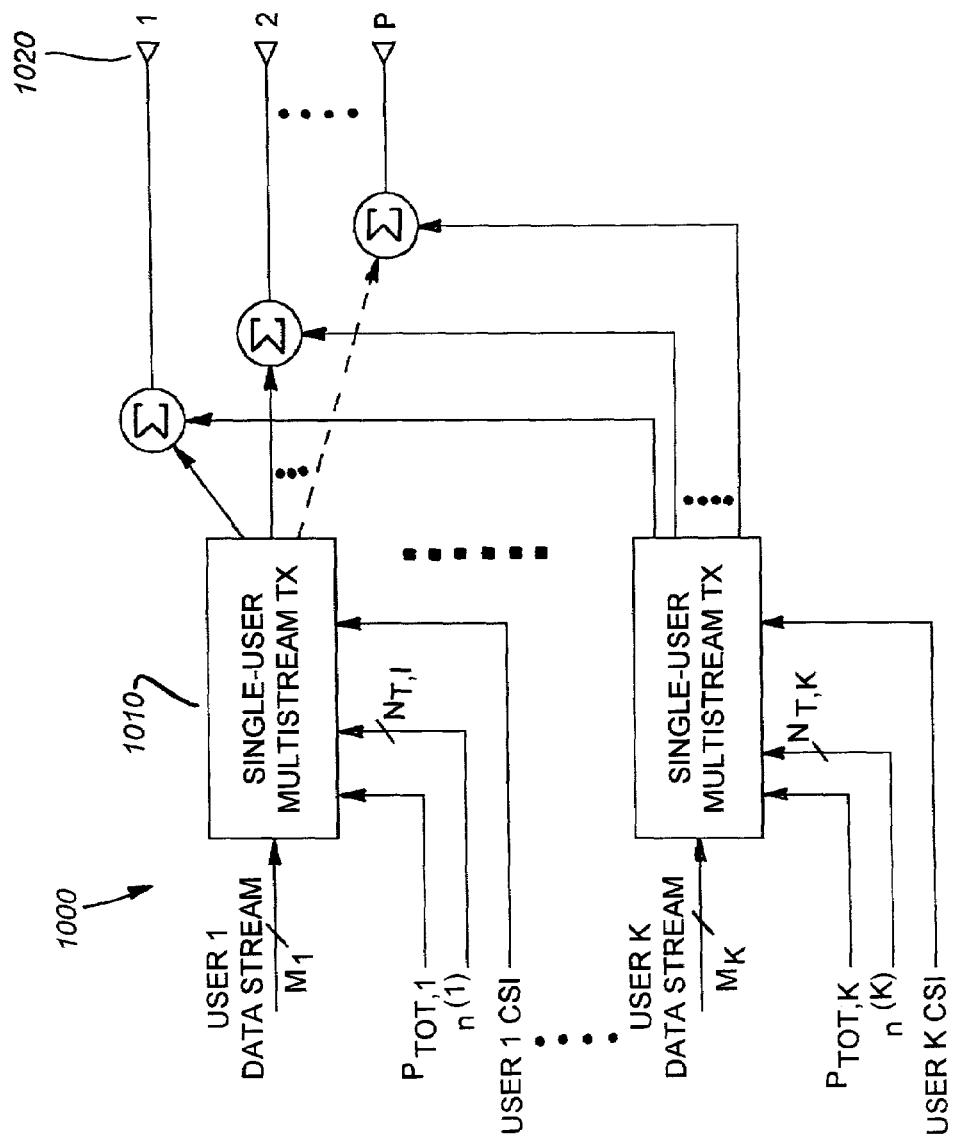
FIG. 24 is an exemplary block diagrams of a general multiuser transmitter according to one embodiment.
Figure 25:
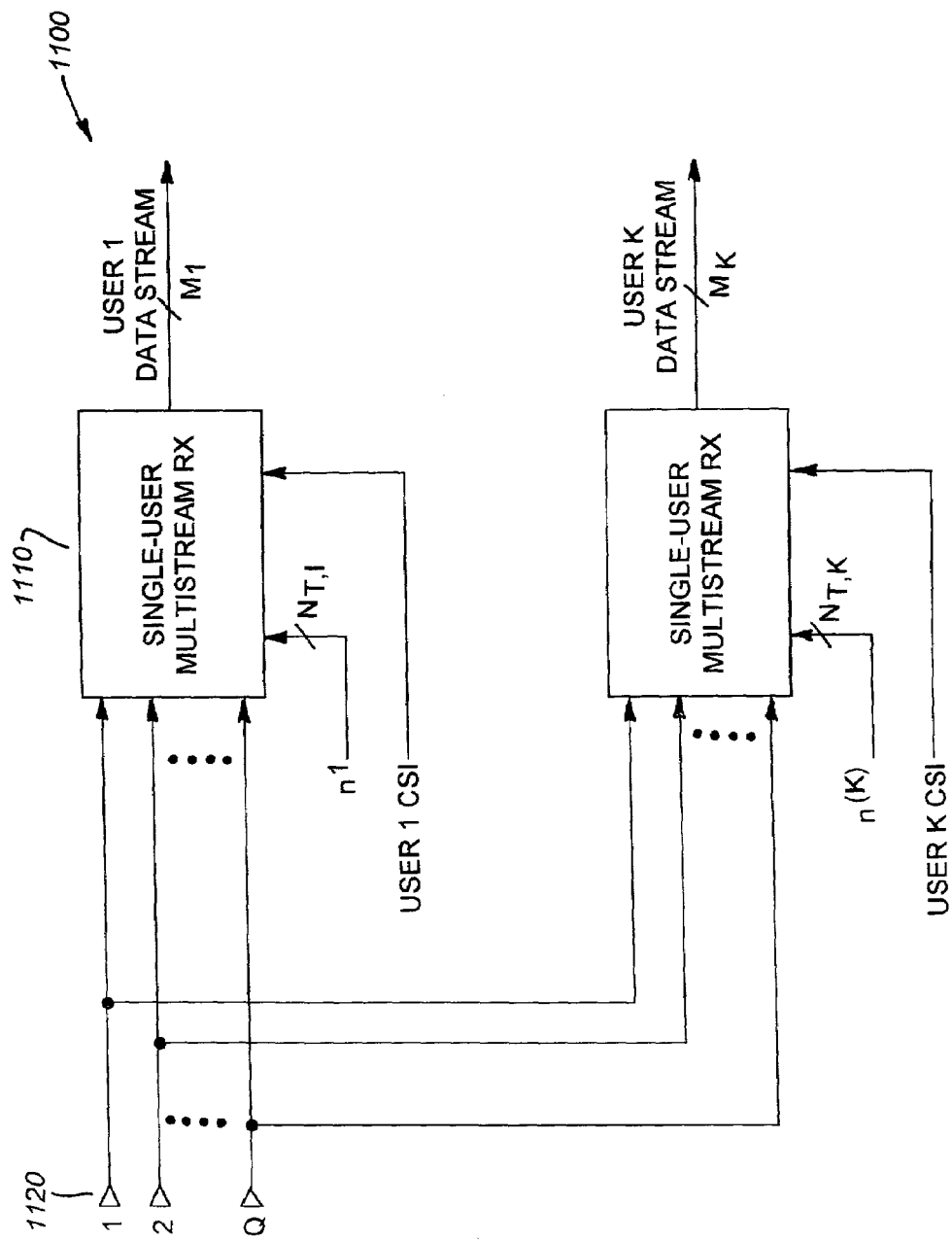
FIG. 25 is an exemplary block diagram of a general multiuser receiver according to one embodiment.

FIG. 24 is an exemplary block diagrams of a general multiuser transmitter 1000. The transmitter 1000 includes a plurality of single user multistream transmitters 1010 and a plurality of antennas 1020. The transmitter 1000 operates in a similar manner to the transmitters described above by utilizing the single user multistream transmitters 1010 which operate similarly to the single user multistream transmitter 800 described above. FIG. 25 is an exemplary block diagram of a general multiuser receiver 1100 for BPSK. The receiver 1100 includes a plurality of single user multistream receivers 1110 and a plurality of antennas 1120. The receiver 1100 operates in a similar manner to the transmitters described above by utilizing the single user multistream receivers 1110 which operate similarly to the single user multistream receiver 900 described above.

While this invention has been described with specific embodiments thereof, it is evident that many alternatives, modifications, and variations will be apparent to those skilled in the art. For example, various like parts and steps can be combined with other various like parts and steps. Accordingly, the preferred embodiments of the invention as set forth herein are intended to be illustrative, not limiting. Various changes may be made without departing from the spirit and scope of the invention.

What is claimed is:

1. A method for managing the usage of a wideband space-time multipath channel having plural orthogonal sub-channels in a communication system including a transmitter having one or more transmit antennas, a receiver having one or more receive antennas, and one or more signal propagation paths between each of said one or more transmit antennas and each of said one or more receive antennas, and having channel state information available at the transmitter, said method comprising:
    estimating a channel for each signal propagation path;
    coherently combining a received signal using the channel estimates across all the receive antennas;
    obtaining a closed-form orthogonal decomposition of the overall effective space-time channel after coherently combining the channel estimates, thereby determining one or more orthogonal sub-channels; and
    selecting one or more of the determined orthogonal sub-channels for communicating information between the transmitter and the receiver.

2. The method according to claim 1, wherein said estimating channel, coherently combining, and obtaining a closed-form orthogonal decomposition is performed for each of a plurality of available signal frequencies.

3. The method according to claim 1, wherein estimating channel includes determining the signal gain, which includes its amplitude and phase, and propagation delay for each signal propagation path.

4. The method according to claim 1, wherein the channel state information is determined at both the transmitter and the receiver.

5. The method according to claim 1, wherein the channel state information is determined at the transmitter.

6. The method according to claim 1, wherein the channel state information is determined at the receiver and signaled to the transmitter via a feedback channel.

7. The method according to claim 1, wherein selecting the one or more of the determined orthogonal sub-channels includes determining a frequency index and a beamformer vector.

8. The method according to claim 7, wherein the frequency index and the beamformer vector are computed at both the transmitter and the receiver.

9. The method according to claim 7, wherein the frequency index and the beamformer vector are computed at the transmitter and signaled to the receiver.

10. The method according to claim 7, wherein the frequency index and the beamformer vector are computed at the receiver and signaled to the transmitter via a feedback channel.

11. The method according to claim 1, wherein a number of orthogonal sub-channels selected correspond to a number of separate channels needed to communicate data at the desired data rate.

12. The method according to claim 1, wherein the orthogonal sub-channels are selected based upon the sub-channels having an acceptable signal to noise ratio.

13. The method according to claim 1, wherein the orthogonal sub-channels are selected based upon the sub-channels having the best gain.

14. The method according to claim 1, further comprising, after selecting orthogonal sub-channels, allocating available transmit power to each of the selected sub-channels.

15. The method according to claim 14, wherein each of the selected sub-channels is adapted for receiving a variable amount of transmit power.

16. The method according to claim 14, wherein a maximum sum of the power allocated to the selected sub-channels is fixed.

17. The method according to claim 14, wherein a maximum sum of the power allocated to the selected sub-channels is fixed, and a separate amount of power allocated to each of the selected sub-channels is variable and is selected to optimize one or more general signal transmission characteristics.

18. The method according to claim 17, wherein the amount of power allocated to each of the selected sub-channels is selected to maximize average data throughput for a given bit-error rate.

19. The method according to claim 17, wherein the amount of power allocated to each of the selected sub-channels is selected to minimize bit-error rate for a given average data throughput.

20. The method according to claim 19, wherein the amount of power allocated to each of the selected sub-channels is determined based upon a comparison of an exact bit error rate for each of the selected sub-channels.

21. The method according to claim 19, wherein the amount of power allocated to each of the selected sub-channels is determined based upon a comparison of a Chernoff bound-based minimum effective bit error rate for each of the selected sub-channels.

22. The method according to claim 1, further comprising, after selecting orthogonal sub-channels, transmitting a data stream via each of the selected orthogonal sub-channels.

23. The method according to claim 22, wherein transmitting a data stream via each of the selected orthogonal sub-channels includes transmitting a plurality of data streams via a plurality of parallel sub-channels.

24. The method according to claim 23, wherein the plurality of parallel sub-channels are allocated between a plurality of users.

25. A channel state processing unit for use in a communication system including a transmitter having one or more transmit antennas, a receiver having one or more receive antennas, and one or more signal propagation paths between each of said one or more transmit antennas and each of said corresponding one or more receive antennas, said channel state processing unit comprising:
- a channel state information estimator including:
  - circuitry configured to determine channel state information,
  - circuitry configured to estimate a channel for each receive antenna,
  - circuitry configured to coherently combine a received signal using the channel estimates across all the receive antennas,
  - and circuitry configured to obtain a closed-form orthogonal decomposition of the coherently combined channel estimates for each receive antenna, thereby determining one or more orthogonal sub-channels; and
- sub-channel selection circuitry configured to select one or more of the orthogonal sub-channels for communicating information between the transmitter and the receiver.

26. The channel state processing unit according to claim 25, wherein said sub-channel selection circuitry includes a frequency index selector and a beamformer weight determiner configured to select a frequency index and corresponding set of beamformer weights for each selected sub-channel.

27. The channel state processing unit according to claim 25, further comprising a transmit power allocator configured to distribute available transmit power between selected sub-channels.

28. The channel state processing unit according to claim 25, further comprising one or more digital signal processors configured to execute a computer program including one or more sets of operational instructions and corresponding data.

29. The channel state processing unit according to claim 28, wherein at least one of said digital signal processors is used as part of said channel state information estimator.

30. The channel state processing unit according to claim 28, wherein at least one of said digital signal processors is used as part of said sub-channel selection circuitry.

* * * * *

UNITED STATES PATENT AND TRADEMARK OFFICE
CERTIFICATE OF CORRECTION

PATENT NO. : 7,110,378 B2
APPLICATION NO. : 09/970460
DATED : September 19, 2006
INVENTOR(S) : Eko Nugroho Onggosanusi, Barry Dean Van Veen and Akbar Muhammad Sayeed It is certified that error appears in the above-identified patent and that said Letters Patent is hereby corrected as shown below:

Column 14, Line 64: Delete "i □" and replace with --i ∈--.

Column 18, Line 10: Delete "$\{\gamma_m\}_{m=1}^N$ dim" and replace with -- $\{\gamma_m\}_{m=1}^{N_{dim}}$ --.

Column 18, Line 12: Delete "$BER_{\mathit{eff}}^{(M)}$" and replace with --$BER_{\mathit{eff}}^{(M)}$--.

Column 18, Line 12: Delete "$BER_{\mathit{eff}}^{(M+1)}$" and replace with -- $BER_{\mathit{eff}}^{(M+1)}$ --.

Column 18, Line 14: Delete "$\{c_m\}_{m=1}^M$" and replace with -- $\{c_m\}_{m=1}^M$ --.

Column 20, Line 1: Delete "PWT" and replace with -- $\rho_{TOT}$ --.

Signed and Sealed this

Seventeenth Day of April, 2007

JON W. DUDAS
*Director of the United States Patent and Trademark Office*